US012056175B2

(12) United States Patent
Saha et al.

(10) Patent No.: US 12,056,175 B2
(45) Date of Patent: Aug. 6, 2024

(54) LABEL MANAGEMENT SYSTEM FOR AN ELECTRONIC DOCUMENT MANAGEMENT SERVICE

(71) Applicants: Atlassian Pty Ltd., Sydney (AU); Atlassian US, Inc., San Francisco, CA (US)

(72) Inventors: Rudra Saha, Jersey City, NJ (US); Swati Katta, Mountain View, CA (US); Henry Jetmundsen, Seattle, WA (US); Balazs Nagy, Mountain View, CA (US); Jerry Qing, Cupertino, CA (US); Frank Wang, San Francisco, CA (US)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 0 days.

(21) Appl. No.: 17/955,488

(22) Filed: Sep. 28, 2022

(65) Prior Publication Data

US 2024/0104129 A1    Mar. 28, 2024

(51) Int. Cl.

| | |
|---|---|
| *G06F 16/38* | (2019.01) |
| *G06F 3/0482* | (2013.01) |
| *G06F 16/31* | (2019.01) |
| *G06F 40/117* | (2020.01) |
| *G06F 40/166* | (2020.01) |
| *G06F 40/169* | (2020.01) |
| *G06F 40/30* | (2020.01) |

(52) U.S. Cl.
CPC ............ *G06F 16/38* (2019.01); *G06F 3/0482* (2013.01); *G06F 16/322* (2019.01); *G06F 40/117* (2020.01); *G06F 40/166* (2020.01); *G06F 40/169* (2020.01); *G06F 40/30* (2020.01)

(58) Field of Classification Search
CPC ...... G06F 16/38; G06F 16/322; G06F 40/117; G06F 40/166
See application file for complete search history.

(56) References Cited

U.S. PATENT DOCUMENTS

| | | | | |
|---|---|---|---|---|
| 7,685,200 B2 * | 3/2010 | Gunawardena | ..... | G06F 16/9535 707/748 |
| 7,831,913 B2 * | 11/2010 | MacLaurin | ........... | G06F 16/353 707/696 |

(Continued)

*Primary Examiner* — Benjamin Smith
(74) *Attorney, Agent, or Firm* — Brownstein Hyatt Farber Schreck, LLP

(57) ABSTRACT

The disclosure is directed to a document management system having a label management user interface. The document management system may be configured to display document content in either a document view mode or a document edit mode in which document content is displayed in a content panel of the graphical user interface. When in the document view mode and an authenticated user has edit permissions with respect to a current document, the graphical user interface is configured to display a label management user interface including an array of user-selectable label graphical objects and a list of recommended labels selected in accordance with a label score. The label score for each recommended label is determined with respect to the current document based on a set of multiple heuristics including proximity of the document with respect to other labeled documents in a hierarchical element tree.

17 Claims, 13 Drawing Sheets

(56) References Cited

U.S. PATENT DOCUMENTS

| | | | |
|---|---|---|---|
| 7,870,135 B1 * | 1/2011 | Cheung | G06Q 30/0601 707/737 |
| 8,086,504 B1 * | 12/2011 | Dicker | G06Q 30/0641 707/750 |
| 8,126,912 B2 * | 2/2012 | King | G06F 16/48 707/777 |
| 8,170,916 B1 * | 5/2012 | Dicker | G06Q 30/0601 705/26.1 |
| 8,566,329 B1 * | 10/2013 | Freed | G06F 16/24578 707/913 |
| 8,578,264 B2 * | 11/2013 | Chen | G06F 40/117 715/236 |
| 8,943,070 B2 * | 1/2015 | Jin | G06F 16/9562 707/767 |
| 9,251,173 B2 * | 2/2016 | DeSpain | G06F 16/58 |
| 9,305,084 B1 * | 4/2016 | McCann | G06F 16/954 |
| 9,367,609 B1 * | 6/2016 | Mianji | G06F 40/117 |
| 9,412,035 B2 * | 8/2016 | DeSpain | G06F 16/284 |
| 9,519,685 B1 * | 12/2016 | McCann | G06F 16/27 |
| 9,892,104 B2 * | 2/2018 | Haynes, II | G06Q 30/0201 |
| 9,971,745 B2 * | 5/2018 | Chen | G06F 40/117 |
| 10,031,903 B2 * | 7/2018 | Haynes, II | G06Q 30/0201 |
| 10,191,990 B2 * | 1/2019 | Sayyadi-Harikandehei | G06F 7/026 |
| 10,296,536 B2 * | 5/2019 | Zuckerberg | G06Q 50/01 |
| 10,460,023 B1 * | 10/2019 | Shriver | G06F 40/117 |
| 10,796,076 B2 * | 10/2020 | Chen | G06F 40/143 |
| 11,151,145 B2 * | 10/2021 | McCann | G06F 16/954 |
| 11,176,315 B2 * | 11/2021 | Brown | G06F 40/169 |
| 11,295,071 B2 * | 4/2022 | Munro | G06F 3/0482 |
| 11,354,490 B1 * | 6/2022 | Shriver | G06F 40/166 |
| 11,392,763 B2 * | 7/2022 | Begun | G06V 30/418 |
| 11,514,238 B2 * | 11/2022 | Begun | G06N 20/00 |
| 2007/0028171 A1 * | 2/2007 | MacLaurin | G06F 16/164 715/825 |
| 2008/0091549 A1 * | 4/2008 | Chang | G06Q 30/0631 705/26.7 |
| 2008/0160967 A1 * | 7/2008 | Narasimhan | G06F 3/0482 455/39 |
| 2008/0215583 A1 * | 9/2008 | Gunawardena | G06F 16/9535 |
| 2008/0256460 A1 * | 10/2008 | Bickmore | G06F 3/0482 715/752 |
| 2008/0282198 A1 * | 11/2008 | Brooks | G06F 16/9562 715/854 |
| 2009/0327336 A1 * | 12/2009 | King | G06F 16/48 |
| 2010/0070851 A1 * | 3/2010 | Chen | G06F 16/986 715/236 |
| 2010/0241991 A1 * | 9/2010 | Bickmore | G06F 16/958 715/810 |
| 2011/0231747 A1 * | 9/2011 | Zuckerberg | G06F 21/6245 715/745 |
| 2012/0016885 A1 * | 1/2012 | Jin | G06F 16/9562 707/E17.143 |
| 2012/0036423 A1 * | 2/2012 | Haynes, II | G06F 3/0483 715/230 |
| 2012/0148158 A1 * | 6/2012 | DeSpain | G06F 16/284 382/190 |
| 2013/0254645 A1 * | 9/2013 | Haynes, II | G06F 40/171 715/230 |
| 2014/0101527 A1 * | 4/2014 | Suciu | G06F 40/169 715/230 |
| 2016/0267127 A1 * | 9/2016 | Mianji | G06F 40/169 |
| 2017/0177589 A1 * | 6/2017 | Shorman | H04L 67/306 |
| 2017/0220582 A1 * | 8/2017 | McCann | G06F 16/9535 |
| 2018/0144052 A1 * | 5/2018 | Sayyadi-Harikandehei | H04N 21/231 |
| 2018/0373415 A1 * | 12/2018 | Dellinger | G06F 3/0486 |
| 2019/0243838 A1 * | 8/2019 | McCann | G06F 16/954 |
| 2019/0332617 A1 * | 10/2019 | Weston | G06F 16/3331 |
| 2019/0361966 A1 * | 11/2019 | Munro | G06Q 50/01 |
| 2020/0301950 A1 * | 9/2020 | Lorrain-Hale | G06F 40/117 |
| 2020/0364294 A1 * | 11/2020 | Brown | G06F 40/295 |
| 2021/0081608 A1 * | 3/2021 | Begun | G06F 40/106 |
| 2021/0081613 A1 * | 3/2021 | Begun | G06F 16/93 |
| 2022/0156312 A1 * | 5/2022 | Nagpal | G06F 16/535 |
| 2022/0414346 A1 * | 12/2022 | Chia | G06N 20/00 |
| 2023/0053344 A1 * | 2/2023 | Hoshino | G06F 40/134 |

* cited by examiner

FIG. 2A

⋈ HOME ˅  RECENT ˅  SPACES ˅  PEOPLE  APPS ˅  [CREATE]  [Q SEARCH]  ♡ ⓘ ⓠ

▦ EXXTREME TRAVEL

≡ OVERVIEW
❞ BLOG
⚙ SETTINGS

▤ PAGES
▲ FY '20
▲ FY '21
▼ FY '22
  • OVERVIEW
  • PYTHON
  • UX
▲ ROLLOUT PLANNING
▲ CUSTOMER FEEDBACK
▲ RESEARCH

LABELLED CONTENT

THIS LIST SHOWS CONTENT TAGGED WITH THE FOLLOWING LABEL: [DESIGN]

*To add a label to the list of required labels, choose '+labelname' from Related Labels.*

▤ *MEETING NOTES*
July 19, 2022 • John Smith
[DESIGN] [CAPSTONE] [CULTURE]

▤ *PROJECT OUTLINE*
August 3, 2019 • Jane Doe
[DESKTOP] [DESIGN] [GRAPHICS]

▤ *INTERVIEW TRANSCRIPT*
January 15, 2020 • Robert Jones
[DOCUMENTATION] [CORE] [DESIGN]

▤ *FINANCIAL FORECAST*
April 5, 2020 • John Smith
[DESIGN] [CULTURE]

▤ *FLOOR PLAN*
February 19, 2021 • Mike Connor
[GRAPHICS] [DESIGN]

RELATED LABELS
[+GRAPHICS] [+RGB]
[+LAYOUT] [+CMYK]
[+COMPOSITION] [+RENDER]
[+PALETTE]

*FIG. 4*

LABEL MANAGEMENT SYSTEM FOR AN ELECTRONIC DOCUMENT MANAGEMENT SERVICE

FIELD

The described embodiments relate generally to methods and systems of graphical user interface for managing electronic documents or pages. In particular, the present embodiments relate to a label management system for suggesting and assigning labels to user-generated electronic documents or pages.

BACKGROUND

Modern enterprises and collaboration platforms typically manage large volumes of electronic documents and other electronic content created by users of the platform. For tenants of an electronic document service that have a large number of content creators, it can be difficult to classify and manage a diverse amount of user-generated content. The systems and techniques described herein can be used to suggest and assign graphical label objects to user-generated content, which can be used by the system for improved searching and other content discovery operations.

SUMMARY

The embodiments and examples described herein are directed to computer systems and computer-implemented methods for managing electronic content of an electronic document management service. In one embodiment, a computer-implemented method including causing display of a graphical user interface in a document edit mode on a client device, and in response to a user input, transitioning the graphical user interface from the document edit mode to a document view mode is disclosed. The graphical user interface may include a content panel configured to receive user input generating document content of a current document, and a navigational panel including a hierarchical element tree having an array of hierarchically arranged tree elements. Each tree element may be selectable to cause document content of a respective electronic document displayed in the content panel. The computer-implemented method includes, while in the document view mode and in accordance with a user of the client device being authenticated and having edit permissions with respect to the current document, causing display of the document content in the content panel, and causing display of a label generation user interface within the content panel. The label generation user interface may include a text entry field configured to receive text input, and an array of selectable label graphical elements positioned within the text entry field. The computer-implemented method includes, in response to a user selection within the text entry field, causing display of a list of suggested labels. Each suggested label in the list of suggested labels may be displayed in accordance with a respective label score that is based on multiple heuristics including a proximity of a current element in the hierarchical element tree corresponding to the current document with respect to other elements in the hierarchical element tree corresponding to other labeled documents.

Other method and system embodiments are also disclosed.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

FIGS. 2A-2C depict example views of a graphical user interface in accordance with the embodiments described herein.

FIG. 4 depicts an example view of a graphical user interface displaying a list of a plurality electronic documents or pages having the same label in accordance with the embodiments described herein.

The use of the same or similar reference numerals in different figures indicates similar, related, or identical items.

Figure 1:
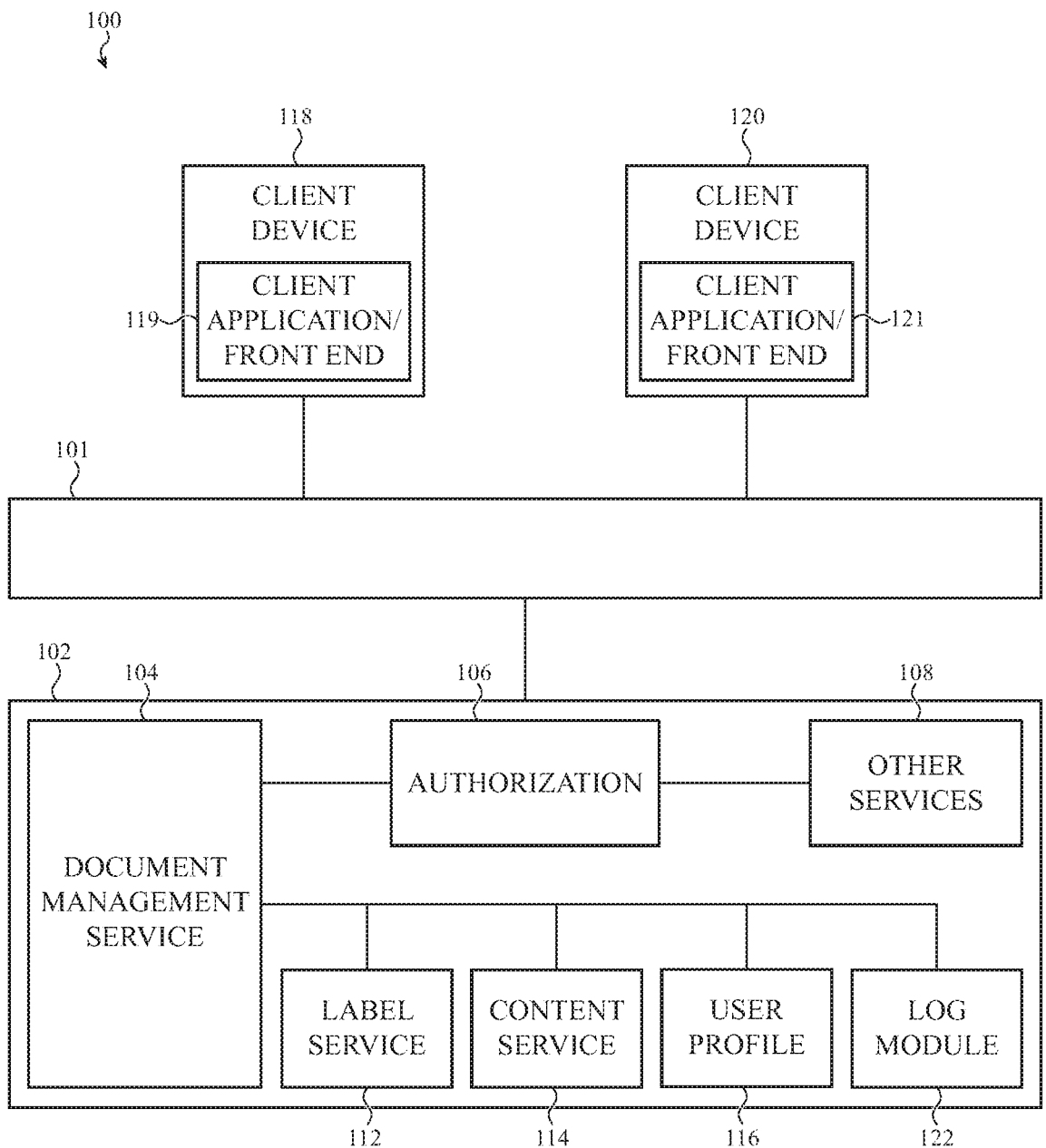
FIG. 1 depicts a system for generating recommended labels and assigning the recommended labels to electronic documents or pages in accordance with the embodiments described herein.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

The systems and techniques described herein are directed to a document management platform or other type of electronic content management system that allows users to create and publish electronic content using a client application. In particular, the systems and techniques described herein may be applicable to document management platforms that use a web browser client application to generate content creation and editing interfaces for creating electronic content and also content viewing interfaces for viewing the electronic content. The systems and techniques described herein are directed to a label discovery and assignment interface, which may also be referred to herein as a label generation user interface, or a label discovery user interface, that can be used to classify user-generated electronic content. The labels may be used to facilitate content searching and other content-discovery operations.

As described herein, a document management platform (or electronic content management system) may provide functionality allowing an authenticated user to create, edit, delete, search, and/or view user-generated content as an electronic document, page, and/or electronic content. The document management platform may be used to manage and store a large volume of electronic documents, pages, and/or electronic content. In some cases, a document management platform may enable search functionality, which may allow a user to search for documents containing user-supplied search terms or phrases. However, search results based solely on user-entered text strings can return too many results if the string is too common or may return too few results if the documents do not have a sufficiently uniform usage of terms to describe the subject of interest. Further, text-based searching typically requires the creation and maintenance of index files and other system elements to enable rapid and accurate search results.

The systems and techniques described herein can be used to improve the search results and reduce the resources that may be required to identify and retrieve electronic content in certain circumstances. Specifically, the systems and techniques described herein can be used to create user-generated labels that can be used to identify, retrieve, and manage labeled pages or documents. The proposed system allows users to create custom labels for user-generated content while also providing recommendations to guide the user regarding existing labels, which may promote more uniformity while also allowing the user to define labels that are relevant to the user-generated content.

Some examples described herein are directed to a label generation user interface that is integrated with a content panel of a document management graphical user interface. In particular, the label generation user interface may be displayed in the same region or area as the user-generated content and may include previously assigned labels depicted as selectable graphical elements or objects. User input provided to the label generation user interface may cause the system to present a list of recommended labels that are selected in accordance with a label score that is computed with respect to the current user-generated content being displayed in the content panel of the graphical user interface. In response to a typing or text input, the label generation user interface may automatically transition from a recommended label mode to a dynamic search mode allowing a user to browse existing labels matching a partial or full text query. The same interface also allows the user to create a new or custom label, which may be assigned to the current content and stored for future labeling operations.

The labels recommended to the user through the interface may be selected and ordered in accordance with a label score that is computed for each recommended label with respect to the current document or page that is being created, edited, or viewed. As described in more detail, herein, the label score may be based on multiple heuristics or measurement techniques, which may be combined and used to rank the label recommendations. Each of the heuristics may measure a different system characteristic or use of labels within the system. For example, the label score may be computed based on a number of factors including, for example, proximity of other labeled pages in a page tree or hierarchical element tree, popularity of the label within a document space or within a set of document spaces managed by a tenant, labels associated with content that has been navigated in a same session or immediately preceding/following a viewing of the current content, similarity of content with other pages in the document space or managed by the tenant's system based on keyword extraction or other content analysis, and other potential factors.

As described herein, the label score may have some factors that are weighed or prioritized over other factors in order to improve the performance of the label recommendation system. For example, location of the electronic content with respect to other labeled content may be prioritized or weighted more heavily than other factors that may also contribute to a particular label score. In some implementations, the weighting or prioritization of the different factors is based on the number of documents or pages managed by the particular tenant system, the use history of the system by the tenant, the amount of user event log data available for analysis, or other factors that may affect the performance of the label recommendation system. In some cases, the combination of heuristics of factors may change and the tenant's use of the system develops or changes over time.

As described herein, the proposed interface may present the user with a ranked or ordered list of recommended labels based on a label score computed for the particular user-generated content. The ranked or ordered list may be developed in order to place higher scoring labels lower in the order or list in order to promote lower scoring labels. This may help to promote a degree of diversity in the label use, which may help to more easily search and access appropriately labeled content. The ranked or order list may also be used to promote labels having a score based on a particular heuristic. For example, labels that are associated with pages or documents that are organized together with the current electronic content may be promoted with respect to labels that are more generally popular but used less frequently with respect to pages or documents that are located nearby or similarly organized. This may help to ensure an appropriate level of uniformity in label use within grouped or hierarchically related content. Furthermore, labels associated with a child or dependent page or document with respect to the current page or document may be promoted with respect to other labels in the scoring or ranking scheme used to recommend labels.

The examples described herein include a label generation user interface that allows the user to initiate label creation, receive label recommendations, perform a label search, and also create a new custom label from within the document or page content. For example, as described herein, a label interface region may be displayed within a content region of an electronic page or document. The label interface region may include a set of existing labels that have been associated with the content in a field that is also configured to receive user input. In response to a user selection or cursor placement within the field, the system may be configured to generate a list of recommended labels, each label selected in accordance with a label score and each recommended label selectable to cause assignment or association of the label with the current content. A user text input provided to the same field may cause the label recommendation window or interface to be replaced with a dynamic label search interface, which provides a list of existing labels matching a partial or complete text entry provided to the field of the interface. User entered text in the same field may also be used to generate a custom or new label that is assigned to the current content and stored for use by other users or for other labeling operations. This interface allows for multiple modes of label discovery and creation without having to leave the context of the user-generated content, which improves the efficiency and operation of the user interface and also helps to promote the use of labels by exposing multiple layers of functionality directly to the user while interacting with a common field or region within the interface.

Once the labels are assigned to the electronic document, page, or electronic content, the labels are stored as part of the user-generated content, a search process of the large volumes of electronic documents, pages, or electronic content may be made more efficient, and may also help the user to easily discern the most relevant electronic documents, pages, or electronic content, as the labels are displayed along with the user-generated content while an electronic document, page, or electronic content is being viewed in a graphical user interface.

These foregoing and other embodiments are discussed below with reference to FIGS. 1, 2A-2C, and 3-11. However, those skilled in the art will readily appreciate that the detailed description given herein with respect to these figures is for explanation only and should not be construed as limiting.

FIG. 1 depicts a simplified diagram of a system, such as described herein. The system 100 is depicted as implemented in a client-server architecture or client-service architecture, but it may be appreciated that this is merely one example and that other communications architectures are possible. In accordance with the examples provided herein, the system 100 of FIG. 1 can be used to provide a series of interfaces to a document management platform or other electronic content management system via a computer network 101. The architecture of system 100 allows for remote access of electronic content using either a dedicated client application (such as a web browser application, a mobile device application, or a native client application) to access backend servers, or a client application (such as a web browser application, a mobile device application, or a native client application) to access one or more web services offered by a backend system. As described herein, the system 100 may be used to create, manage, and display content for electronic content.

The networked computer system or system 100 of FIG. 1 depicts an example configuration in which multiple client devices 118, and 120 may access a host server 102 of a set of host servers via a computer network 101. The computer network 101 may include a distributed network which may include local networks, gateways, and networking services provided by one or more internet service providers. The client devices 118, and 120 are able to create, search, view, and share content via the network 101 either directly or through the various services provided by a host server 102 of the set of host servers.

The client devices 118, 120 execute or operate respective example client applications 119, 121, which may include a dedicated client-side application or may be a web browser client application. The client applications 119, 121 may also be referred to herein as front end applications and may provide one or more graphical user interfaces for interfacing with the back end applications or services provided by the host server 102. The client devices 118, 120 typically include a display, processing unit, computer memory, and other hardware components. An example device including hardware elements is described below with respect to FIG. 11.

The host server(s) 102 may include one or more servers and may also be referred to as hosted services, which may provide multiple platform services. For example, the multiple platform services may include a document management service 104, which may also be referred to as document management platform, document collaboration platform, a document management service, or a document management platform. The platform services may also include a label recommendation service 112, a content store or content service 114, and one or more user profiles 116. The multiple platform services may also include other services 108, which may include an issue tracking service, a code management service or code repository, messaging and event feed services, and other collaboration or data management services. A platform service of the multiple platform services may be implemented as one or more instances of the platform service executing on one or more host servers 102. The multiple platform services may also provide different services including, for example, issue tracking services for creating, managing, and tracking issues for software development, bug tracking, and/or information technology service management (ITSM) services.

As shown in FIG. 1, the system 100 includes the host server(s) 102 which may include a set of host servers adapted to operate as a host of multiple platform services. The host sever 102 may use one or more virtual or physical computing resources (collectively referred in many cases as a "cloud platform"). In some cases, the host server(s) 102 can be physically collocated or in other cases, each may be positioned in a geographically unique location.

The host server 102 can be communicably coupled to one or more client devices by a network 101. Multiple example client devices are shown as the client device 118, and 120. In many embodiments, the client devices 118, and 120 are personal computing devices such as desktop computers, laptop computers, or mobile phones. This is merely one example and is not required of all embodiments. The host server 102 of the set of servers hosts services and/or other server components or modules to support infrastructure for one or more backend applications, each of which may be associated with a particular software platform, such as a documentation platform or an issue tracking platform. For example, the host server 102 may host a document management service 104, an authentication/authorization service 106, a label recommendation service 112, and other services 108. The host server 102 may also include an event log module 122, and a user profile module 116. The host server 102 may also have a local cache or local storage of electronic documents or pages of user-generated content 114.

The document management service 104 may provide an interface to client devices 118, and 120 to the one or more backend applications, and/or software platforms, such as a documentation platform or an issue tracking platform. The client devices 118, and 120 may be executing a frontend application that consumes services provided by the document management service 104. Accordingly, a user of a client device 118, or 120 may create, edit, search, and/or view electronic documents, pages, or electronic content using the interface provided by the document management service 104. By way of a non-limiting example, the interface provided by the document management service 104 may be webservice based, such as a REpresentational State Transfer (REST) webservice. The electronic documents, pages, or electronic content may be transferred between a client device and a host server using one or more of JavaScript Object Notation (JSON), EXtensible Markup Language (XML), HyperText Markup Language (HTML), and/or a proprietary document format.

The document management service 104 allows a user to create, edit, search, and/or view electronic documents, pages, or electronic content based on authentication and/or authorization of the user using the authentication/authorization service 106. The authentication/authorization service 106 may authenticate a user based on user credentials, which may include a username or other user identification, password or pin, biometric data, or other user-identifying information. The user credentials may be stored and tracked using a token, authentication cookie, or other similar data element.

Upon successful authentication/authorization of a user, the document management service 104 may access a user profile module 116 to get a user profile associated with a user of a client device. The user profile associated with the user may suggest various permissions of a user for creating, editing, accessing, searching, and/or viewing various electronic documents, pages, or electronic content. The user profile associated with the user may also identify other details of the user, including but not limited to, a role of a user in an organization, one or more groups to which a user is a member, other users of the one or more groups to which the user is a member, one or more projects related to the user, one or more issues or tickets (managed by an issue tracking system) the user is assigned to, and so on. The user profile may include, but not limited to, user permission settings or profiles, and user history that may include user logs or event histories, system settings, administrator profile settings, content space settings, and other system profile data associated with the backend applications described herein and associated with the user.

Accordingly, the user of the client device may create, edit, access, search, and/or view electronic documents, pages, or electronic content based on permissions granted to the user based on the retrieved user profile, and labels may be recommended to the user according to the permissions granted to the user, and/or based on permissions granted to the user with respect to various electronic documents, pages, or electronic content. The other services 108 described herein may provide a user interface to other applications or services, for example, an issue tracking system, to create, edit, search, or view an issue or ticket on the issue tracking system. Thus, the document management service 104 may generate electronic documents, pages, or electronic content which may also include data associated with one or more issues managed by the issue tracking system.

While the document management service 104 is rendering electronic documents, pages, or electronic content to the user in a graphical user interface, in an edit mode of the graphical user interface, the document management service 104 may also generate and display a label generation user interface. The label generation user interface, which is described in detail below, recommends labels to a user to select and apply to the electronic document, page, or electronic content being edited by the user. The label generation user interface may also allow the user to delete, remove, or unassign a label from the electronic document, page, or electronic content in the edit mode of the graphical user interface.

The system may also include one or more event log modules 122, which may track and/or store user actions, system events, or other data generated in accordance with activity performed by the system users. Specifically, the event log module 122 may include navigation events that are generated in response to user selection or navigation to various page, documents, or other content on the system. The navigation events may be used to determine which pages have been navigated to by a user either before or after a particular page or document. In some cases, the navigation events are used to determine a set of pages or documents that have been navigated to or viewed by the user within a session or designated time frame. The user event log 122 may also be used to store other properties of a session including, for example, average dwell time for a page or document, user interactions with content including likes, comments, and other feedback, or other application use or other user activity observed during a session or time period. Details of the various events may be accessed by the label recommendation service 112 for determining other electronic documents, pages, or electronic content that may be relevant for analysis for determining a list of recommended labels to the user for the electronic document, page, or electronic content being edited by the user.

The host server 102 may store electronic documents, pages, or electronic content, as well as historical labels recommended by the label recommendation service 112, in a local database, local storage, memory, or cache. However, the host server 102 may also store and/or access electronic documents, pages, or electronic content in a remote database, memory, or cache (for example, in a cloud environment). By way of a non-limiting example, electronic documents, pages, or electronic content stored in the local database, memory, or cache may be user-generated content, content space data, content tree data, content metadata and other electronic content associated with the various backend applications described herein. The user-generated content may be stored as page objects, document objects, or other data elements.

Figure 2A:
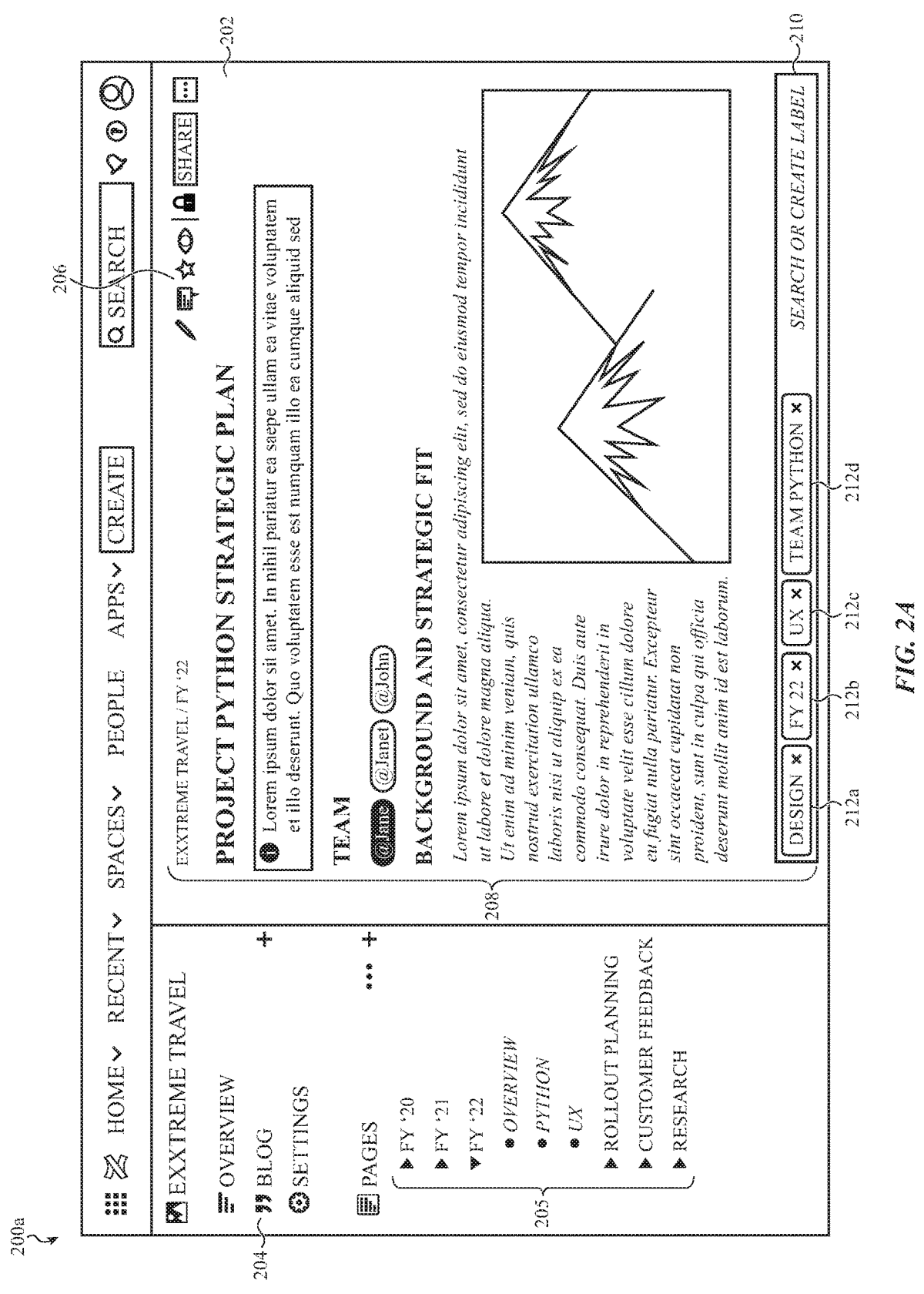
Figure 2B:
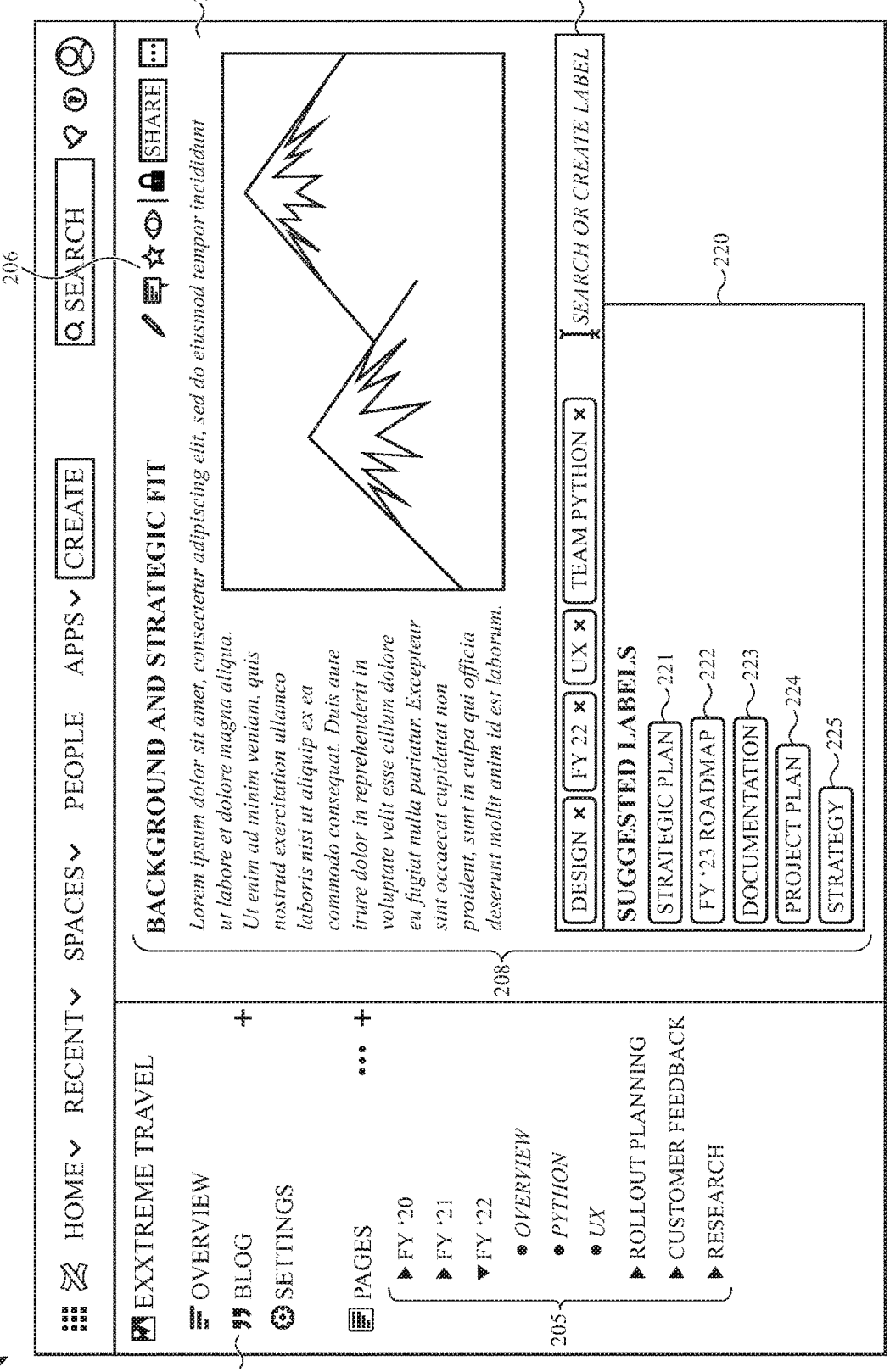
Figure 2C:
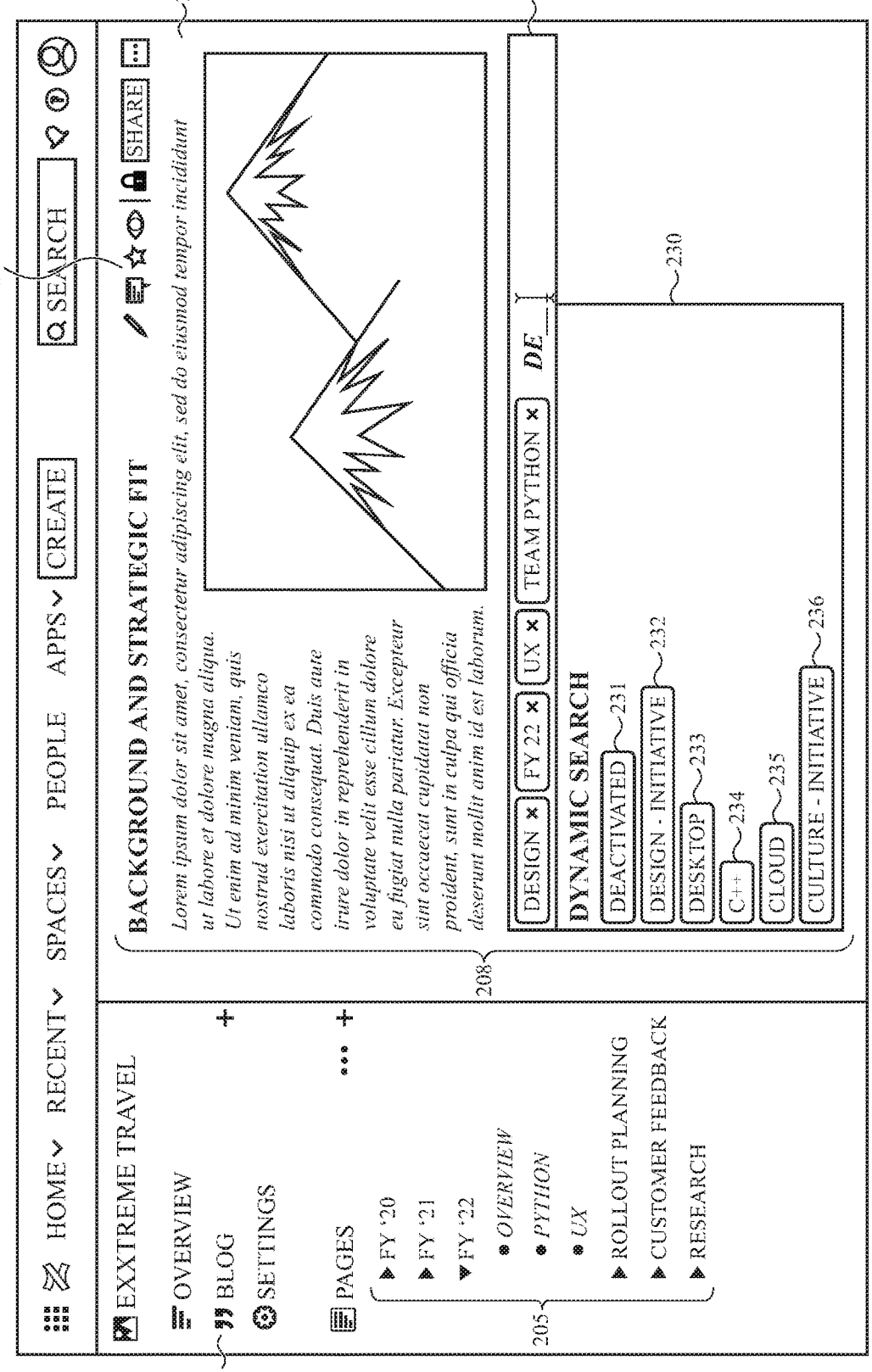

FIGS. 2A-2C depict example views of example graphical user interfaces provided by a frontend or client application operating on a client device. The graphical user interface provided by the frontend or client application may operate in one of a number of different modes. In a first mode, a user may create, edit, or modify an electronic document, page, or electronic content. This mode or state of the graphical user interface may be referred to as a document edit mode, page edit mode, editor user interface, content-edit user interface, a page-edit user interface, or document-edit user interface. In a second or other mode, the user may view, search, comment on, or share the electronic document, page, or electronic content. This mode or state of the graphical user interface may be referred to as a view mode, document view mode, page view mode, viewer user interface, content-view user interface, a page-view user interface, or document-view user interface. The graphical user interface may be implemented in a web browser client application using HTML, JavaScript, or other web-enabled protocol.

The graphical user interfaces of the following examples relate to a label generation user interface (also referred to as a label discover user interface), which may be used to discover, search, create, and assign labels to user-generated content. As described in the following figures, a user with appropriate permissions with regard to a particular page or document may use the label generation interface to discover recommended labels that are selected for the user-generated content of the current page or document. The user may also transition directly from a recommended label interface to a dynamic search interface automatically in response to text input into a field or text input region of the label generation user interface. Using the same field or text input region, the user can also create a new custom label. Once a label is assigned to the user-generated content, the content can be searched, organized, and otherwise accessed by the system.

In some example implementations, the label generation user interface or label discover user interface may be invoked from within a page or document view graphical user interface or mode. The example interfaces described with respect to FIGS. 2A-2C display the label generation user interface from within a content panel of the document view graphical user interface, which allows multiple layers of functionality to be performed without leaving the context of the document or page view. Specifically, from a common text input region, a user may view an array of selectable label graphical objects (e.g., 212a-212d of FIG. 2A) that are assigned to a current page or document. A user input (e.g., a user selection or cursor placement) with regard to the text input region may cause the system to display a window (e.g., popup window 220 of FIG. 2B) having a list of recommended labels (e.g., 221-225 of FIG. 2B) which are selected in accordance with a label score. Further, text input provided to the same text input region may case the system to replace the recommendation window with a dynamic search window (230 of FIG. 2C) having a list of labels matching the partial or full text input provided to the text input region. Any of the displayed labels, whether recommended or matching the dynamic search terms, may be selectable in order to cause assignment of the respective label to the current page or document.

The same text input region may be used to create a new or custom label. The completion of a text input (as detected by a carriage return or other user input) may cause a new label to be created. Specifically, if the text input does not correspond to one of the labels displayed in the dynamic search results, a new label may be created, which may be stored and used for further label operations.

The graphical user interface may be transitioned between the edit and view mode, in response to a user having edit permissions with regard to the current page or document. Through the user interface, the user may create, edit, or otherwise modify user-generated content, including but not limited to, content of the page, one or more labels corresponding to the page, page status, and so on. For example, the user may select one or more labels from a list of recommended or suggested labels, and/or create a new label for the page. The user-generated content, which may also include one or more labels of the page, may be referred to herein as page content, document content, electronic content, or simply content.

Various examples in FIGS. 2A-2C depict a graphical user interface in a viewer or document/page view mode. For example, a graphical user interface 200a shown in FIG. 2A is a rendering of an electronic document, page, or electronic content 202 on a client device, such as the client device 118 or 120. The electronic document, page, or electronic content 202 may be rendered on the client device by the document management service 104 upon authorization/authentication of a user by the authentication/authorization service 106, and based on permissions granted to the user according to a user profile associated with the user. In one example, the graphical user interface 200a may have various partitions/sections displaying different content. For example, the graphical user interface 200a may include a navigational panel 204, a page toolbar 206, and a content panel 208.

The navigational panel 204 may include a hierarchical element tree 205, which may also be referred to herein as a page tree. The hierarchical element tree 205 may include an array of hierarchically arranged tree elements. Each tree element of the array of hierarchically arranged tree elements may be positioned and/or displayed with respect to its respective relationship with a current electronic document, page, or electronic content being displayed in the content panel 208. Further each tree element of the array of hierarchically arranged tree elements may be selectable. In other words, in response to a user action or user input with respect to a tree element, an electronic document, page, or electronic content associated with the tree element may be displayed in the content panel 208 or a new instance of a graphical user interface.

While the content (for example, the user-generated content) for reading or viewing by the user is displayed in the content panel 208, the content panel 208 may also display a label generation user interface within the user-generated content of the content panel 208. The label generation user interface may include a text entry field 210 (also referred to as a text entry region), and an array of selectable label graphical elements 212a, 212b, 212c, and 212d positioned within the text entry field 210. The selectable label graphical elements 212a, 212b, 212c, and 212d have been previously assigned to the current page or document and are each selectable in order to cause display of a label search result interface (similar to the example depicted in FIG. 4 described below.

Note that the label generation user interface and text entry field 210 are displayed for anyone with view permissions with respect to the current page or document in the page or document view mode. However, only users having edit permissions with respect to the current page or document may add or delete labels associated with the current page or document. Furthermore, if the graphical user interface is transitioned from a document or page view mode to a document or page edit mode (by, for example, selection of the pencil control in the selectable controls 206), display of the label generation user interface and the array of selectable label graphical elements 212a, 212b, 212c, and 212d may be suppressed. Once the graphical user interface is transitioned back into a page or document view mode (by, for example, selecting a "publish" or view" control in the selectable controls), any revised user-generated content may be displayed and the label generation user interface may be displayed (or unsuppressed). In some cases, the display of the navigation panel 204 may also be suppressed when the graphical user interface is in a page or document edit mode.

As shown in the graphical user interface 200a of FIG. 2A, each selectable label graphical object 212a-212d displayed in the text entry field 210 may have a respective delete control to delete or remove the particular label. For example, the respective delete control may be a region designated by the "x" depicted within each selectable label graphical object. User input provided to the delete control may cause the label to be deleted or removed from the text entry field. Additionally, or alternatively, the user may right click on the label, and the user may be presented an option to delete or remove the label from the text entry field. In some cases, when the label is deleted or removed from the text entry field, a check may be performed to determine whether the removed label is assigned as a label to any electronic document or page being managed by the document management platform. Upon determining that the removed label is not assigned to any electronic document or page, the removed label may be removed from the local storage or memory from a registry of available labels.

In response to a user input (e.g., a cursor placement or a selection) with regard to the text input field or region 210, the label generation user interface may transition to display a label recommendation window 220, which includes a list of suggested or recommended labels 221-225. Each label of the list of suggested or recommended labels 221-225 may be selected in accordance with a label score and may be displayed in an ordered list that is determined, at least in part, on the label score. In some cases, a label having the highest label score may be displayed first followed by other labels based on their respective label score in a descending order. However, in order to promote different labels and encourage a diversity of labeling schemes within the system, the highest scoring label may be listed lower in the order resulting in the first or higher-listed labels having a lower score than a lower-listed label. In some cases, the order of the labels is determined based on one heuristic of the multiple heuristics used to compute or determine the label score. For example, in order to promote a label having a popularity index that is low with respect to a document space or tenant (having multiple document spaces), the position of the label in the order of the list may be promoted or boosted in order to encourage use of the particular label. Similarly, labels having a higher score due to the hierarchical page tree proximity may be boosted with respect to other similarly scored labels. This may encourage label consistency with respect to pages or documents that are organized together in a common document space.

The label score may be determined in accordance with a set of multiple selection heuristics. The heuristics may be a combination of a heuristic based on labels associated with pages or documents that are similarly organized, a heuristic based on label popularity (e.g., a popularity index) within a document space or for a particular tenant, and/or heuristics based on other characteristics of the current page or document. Each heuristic may also be associated with an analysis of the content of the current page or document in order to classify the current page or document with respect to a set of keywords or subject matter of the content. The analysis may include a semantic analysis of the title of the content, a content summary, a content narrative, or other portions of the content associated with the page or document. In some cases, the analysis may also include an analysis of the page or document metadata.

Generally, a suggested label may be selected based on content of the page, and/or content of the one or more other electronic documents or pages associated with a tree element of an array of hierarchically arranged tree elements shown in the navigational panel 204. Further, the one or more other electronic documents or pages for recommending a label are selected based on their proximity in the page tree with the electronic documents or page for which the label is being recommended. Further, labels associated with an electronic document or page that is more proximate to the electronic document or page for which the label is being recommended may be given a higher label score over another electronic document or page which is farther away in the page tree. In other words, a label associated with a document or page that is more proximate to the electronic document or page for which the label is being recommended may have a higher respective label score in comparison with another electronic document or page that is less proximate to the electronic document or page for which the label is being recommended. Additionally, or alternatively, the one or more other electronic documents or pages may be selected for label recommendation based on their semantic similarity or semantic relatedness with the electronic document or page for which the label is being recommended. Semantic analysis or semantic relatedness for label recommendation is described in detail below with reference to FIG. 5.

While proximity of an electronic document or page in a page tree 205 is one factor in calculating or determining a label score, popularity of a label may be another factor in calculation or determination of the label score. In some cases, the popularity of a label may be determined based on a number of users selecting a particular label, and/or a number of documents having the particular label and may be measured or computed as what is referred to as a popularity index. The popularity index may be a normalized metric of label usage that represents the frequency of use of a particular label as normalized by labeling activity in the system. The popularity index may be based on activity within a particular time frame or time window, which may omit old or outdated user labeling activity, which may be less relevant to current content or labeling schemes.

In some cases, a suggested label may be selected based on session data or context data regarding a particular session in which an electronic document or page is being edited, and/or a label is being recommended for the electronic document or page. The session or context data may include, but is not limited to, one or more electronic documents or pages created, edited, viewed, and/or accessed by the user in the current session, and their respective content and/or metadata, and/or one or more labels applied and/or recommended during the current session. In some cases, the one or more electronic documents or pages created, edited, viewed, and/or accessed by the user in the current session for label recommendation may be selected based on a number of navigational events and/or a sequence of creating, editing, viewing, and/or accessing of the one or more electronic documents or pages with respect to the electronic document or page for which a label is being recommended. In other words, a label may be recommended or suggested based on one or more electronic documents or pages which may be organized together in a page tree 205, and/or which may be typically viewed together in a given session or series of navigational events.

For example, if more users are visiting a particular page X after and/or before viewing the current page, a label selected based on content of the particular page X may have a higher respective label score in comparison to a label selected based on content of another page Y, which has a greater number of navigational events or page/document visits between a viewing of page Y and the current page. That is, page Y can be characterized as having a reduced navigational event metric as compared to page X. By way of further example, for the pages visited by the user in a session, a label selected from content of a page visited immediately before or after the current page may have a higher respective label score in comparison with a label selected based on content of another page that has been not visited immediately before or after the current page.

In the graphical user interface 200b of FIG. 2B, five labels are shown as being recommended to the user for the current electronic document or page. However, an actual number of labels being recommended may be limited to a predetermined number of labels, for example, four labels or five labels.

As described earlier, previously assigned labels 212a-212d are displayed in the text entry field 210, which is configured to receive user input or text input in the text entry field 210. In response to a user input provided to the text entry field 210 (e.g., a user selection within the field or region or a cursor hover over the field or region), a recommendation window 220 may be displayed or rendered. As shown in the graphical user interface 200b of FIG. 2B, a popup window or floating window overlaying the user-generated content of the content panel 202 may be displayed with the list of recommended or suggested labels 221-225. As described previously, the recommended or suggested labels 221-225 may be selected and ordered in accordance with a respective label score that is computed for each label with respect to the current document or page displayed in the content panel 202.

Further, as described above, the user is displayed recommended labels for the electronic document in the text entry field 210, and in the pop-up window 220, in response to the user providing an initial user input to the text entry field 210. As the user starts to type in the text entry field 210, as shown in a graphical user interface 200c of FIG. 2C, the window 220 may be replaced with a second dynamic search window 230. As shown in FIG. 2C, in the graphical user interface 200c, the dynamic search window 230 may include a list of labels that are generated in response to a full or partial match with respect to the user-entered text provided to the text entry field 210. In some cases, one or more labels displayed in the pop-up window 220 may be automatically and dynamically updated based on the user input in the text entry field 210. For example, if the user has typed "DE" in the text entry field 210, the pop-up window 230 may include labels 231-236 that are partially matching with the user input "DE," such as "deactivated," "design-initiative," "desktop," "C++," "cloud," and "culture-initiative". The list of labels 231-236 depicted in window 230 may be arranged in accordance with an alpha-numeric order and may include labels that are not a partial match but follow in alpha-numeric order from labels that are a partial or full match. For example, if there is an insufficient number of existing labels starting with "DE", the system may return results starting with "C" that already exist in the system. In some cases, labels with a low usage or that have been flagged for obsolescence may be filtered or removed from the list.

The user may either select one of the labels displayed in the pop-up window 230, or continue providing additional user input in the text entry field. In some cases, if a label "design-initiative" is selected by the user, and therefore displayed in the text entry field as a label graphical element, if the user provides "DE" as an input to the text entry field to select another label, "design-initiative" may not be displayed or listed again in a pop-up window even though it partially matches with the user input.

In some cases, the labels are displayed in the pop-up window 220 or the pop-up window 230 according to their respective label score calculated or determined as described herein in accordance with various embodiments. The user may save the page content to assign the labels to the page, or the page content may be automatically saved periodically or upon the user exiting the graphical user interface from the editor mode.

Figure 3:
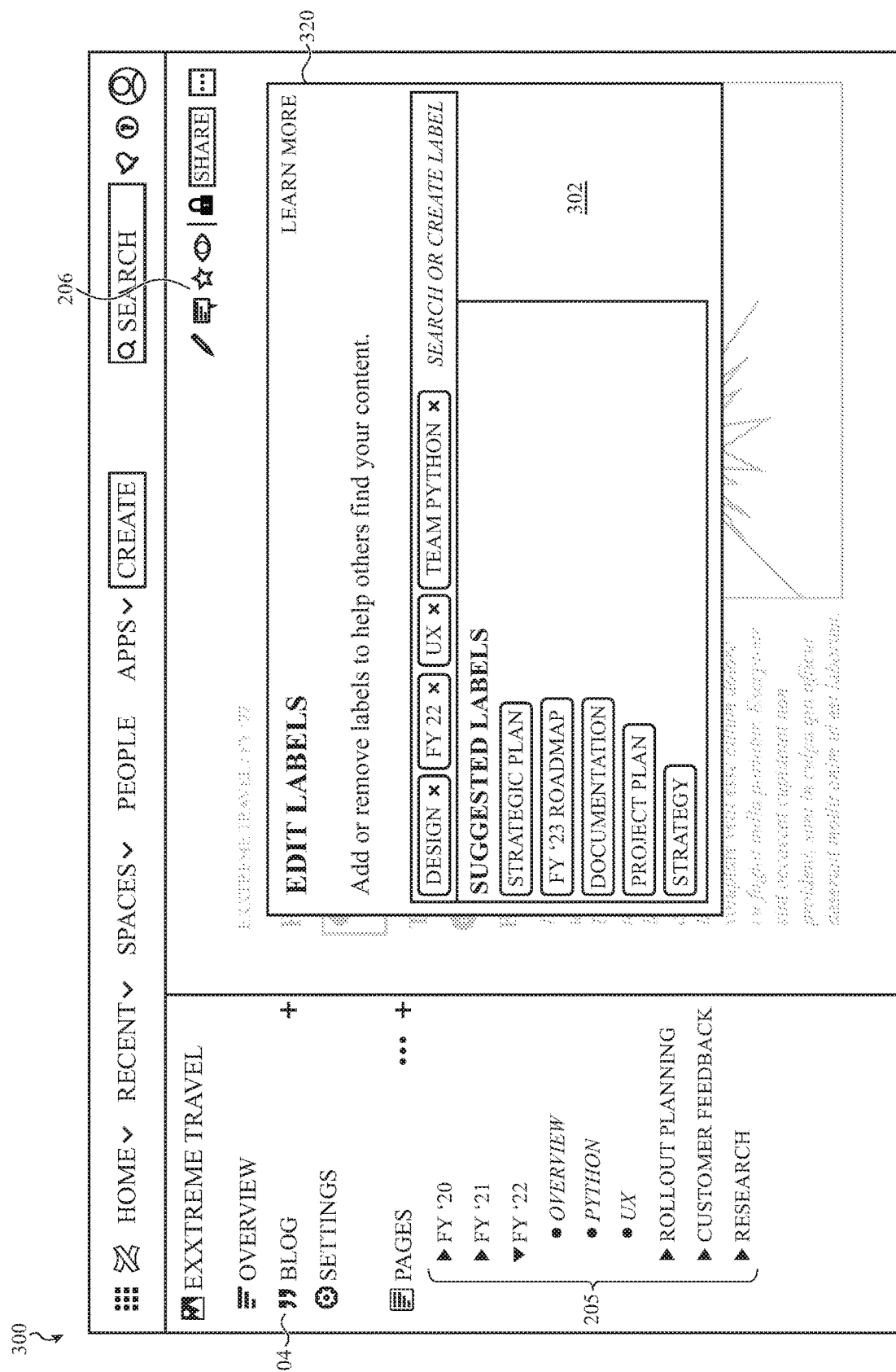
FIG. 3 depicts an example view of a graphical user interface for editing labels assigned to an electronic document or page in accordance with the embodiments described herein.

FIG. 3 depicts an example view of a graphical user interface 300 for editing labels assigned to an electronic document or page in accordance with the embodiments described herein. In the example of FIG. 3, the label generation user interface 302 may be displayed in a floating window 320 that overlays or overlaps the user-generated content of the current page or document displayed in the content panel. The label generation user interface 302 may be displayed in response to a user selection of a control in, for example, controls 206 or another control associated with label modification. The label generation user interface presented to the user in the pop-up window 320 may provide the similar features and functionalities discussed herein with reference to FIGS. 2A-2C, and is not repeated with respect to this figure to reduce redundant description of such features and functions.

FIG. 4 depicts an example view of a graphical user interface 400 displaying a list of a plurality of electronic documents or pages having the same label in accordance with the embodiments described herein. Specifically, the content 408 includes a list of objects associated with a document space or set of documents spaced provided by the tenant that are associated with a particular label. Each label displayed in a graphical user interface shown in FIGS. 2A-2C, and 3 may be a selectable graphical element, which means a user can click, double click, tap, or double tap on the label graphical element to view one or more electronic documents or pages having the same particular label, as shown in an example view of a graphical user interface 400 in FIG. 4. As shown in the graphical user interface 400, one or more electronic documents or pages having the particular label may be displayed in the content panel 208. Alternatively, the one or more electronic documents pages having the particular label may be displayed in a pop-up window. Further, the one or more electronic documents or pages may be displayed in an order based on their semantic similarity or semantic relatedness with the electronic document or page which the user is currently creating, editing, accessing, or viewing.

In some cases, one or more other related labels 406 that are generally used or applied to electronic documents or pages with the particular label may also be listed. Accordingly, the user may apply one or more related labels to the electronic document or page, which may further improve searchability of the electronic document or page. Further, functions and aspects of the graphical user interface 400 may be displayed and available to the user in editor and/or viewer mode of the graphical user interface.

Figure 5:
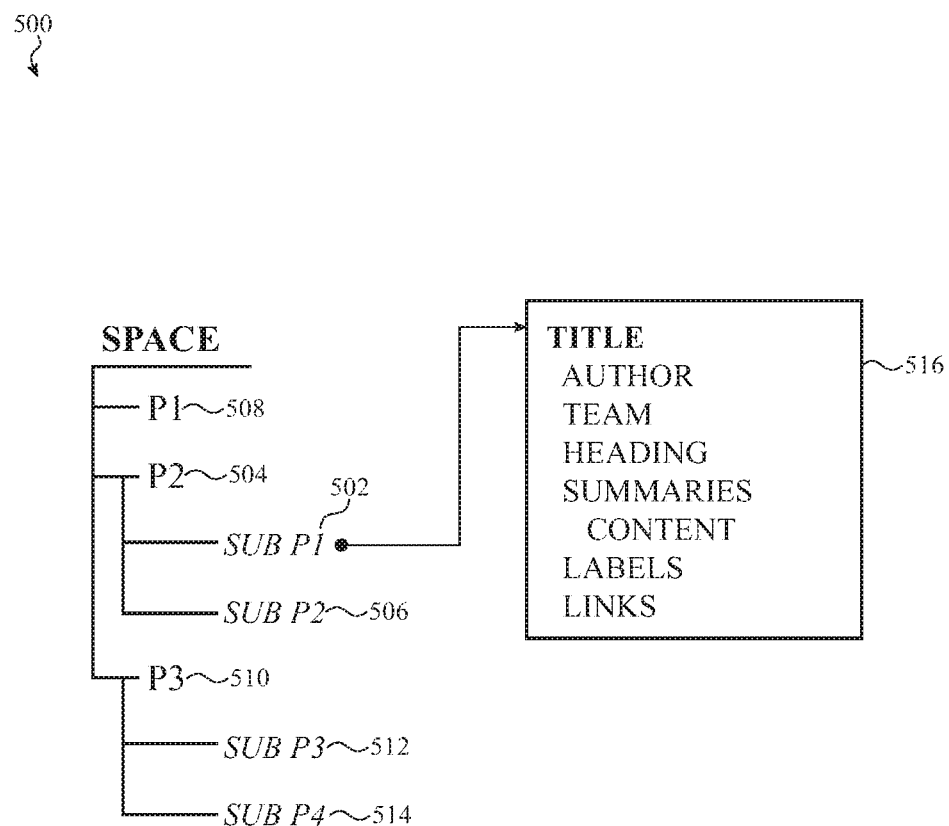
FIG. 5 depicts an example of a page structure in accordance with the embodiments described herein.

FIG. 5 depicts a logical representation of a hierarchical element tree in accordance with the embodiments described herein. The hierarchical element tree is also referred to herein as a page tree and represents the hierarchical relationship of pages within a document space. As described herein, the document space may be used to refer to a container in which users can create pages or documents, blog posts, calendars, and other user-generated content. Users of the content collaboration system, also referred to herein as a document management system or document management service, can create new spaces, collaborate with other user's spaces and browse or view all of the spaces associated with a tenant for which the user has permissions to view. Within a space generated by a particular user, the particular user is typically granted view and edit permissions for all content created within that space. This allows the particular user to generate new documents and pages, new blog posts, calendar entries, and label user generated content in accordance with the techniques described herein. For a given space, the types of document that may be created, a default document hierarchy scheme, document templates, user permissions, and other settings may be determined by the type of space created by the user (e.g., a "team space," "documentation space," "knowledge base space," "software project space").

The page tree 500 shows how pages or documents may have a parent/child relationship within a given document space. As shown in FIG. 5, a current document 502 may be viewed or edited by an appropriate system user and may be a child page of a page 504. The page 504 may have another child page 506. As shown in the page tree 500, the page 504 may be at the same hierarchical level in the page tree 500 as a page 508 and a page 510. The page 510 may also have child pages 512 and 514. Each page of the pages 502, 504, 506, 508, 510, 512, and/or 514 may be directed to a similar subject or overall theme associated with the document space.

As described herein, pages that are organized together and, in particular, pages that are organized closely together or closely proximate to each other in a page tree tend to be more likely to relate to a common subject or type of content. In such cases, it may be beneficial to label related content using a consistent labeling scheme and, as described herein, the label generation or label discovery interface may be adapted to leverage both the structural relationships between pages or documents in a page tree 500 and similarities in the user generated content 516, which may include page title, page creator or author, content headings, content summaries, existing labels, links, and other content or data associated with a page or document. Specifically, the label generation user interface described herein may present labels to a user based on a label score that is determined based on a set of heuristics, which includes a proximity heuristic based on an analysis of similarly organized pages in the page tree 500, a subject matter heuristic based on an analysis of user generated content 516, a popularity heuristic based on an analysis of user event logs or existing label structures and may reflect historical usage of a label with respect to a particular space or group of multiple spaces associated with a particular tenant.

With respect to the page tree 500 of FIG. 5, proximity of the other documents or pages with respect to the current page 502 may be measured using a proximity heuristic used to compute a label score for a recommended or suggested label presented for page 502. By way of example, labels associated with a sibling page 506 may be given a higher label score than labels associated with pages 508, 510, 512, or 514, which are less proximate to page 502 than sibling page 506. Similarly, labels associated with parent page 504 may have a higher label score because page 504 is adjacent to page 502 in the hierarchical scheme of the page tree 500. In some cases, labels associated with child pages are given a higher label score as child labels may be more likely to be related to the given parent due to the organizational structure of the page tree.

In addition to the proximity heuristic, a subject matter or semantic heuristic may be applied to determine a semantic similarity or subject matter similarity index between pages or documents using the user generated content 516, metadata, or other data associated with the pages or documents. In one example, content 516 of the electronic document or page 502 for which the label is being recommended, and one or more other pages may be analyzed to determine semantic similarity or semantic relatedness between them to determine or select a label for recommendation to a user, and/or determining or calculating a label score. Higher semantic similarity or semantic relatedness may increase a label score for a label recommended based on content of the one or more other pages. Semantic similarity or semantic relatedness may be determined using natural language processing techniques including lemmatization and stemming, keyword extraction, tokenization, topic modeling, text classification, and other techniques. In some cases, the natural language processing is implemented using one or more machine learning algorithms, neural network, and/or artificial intelligence, which analyzes content for subject matter similarity, keyword identifications, and so on. In some examples, content created, edited, viewed, and/or accessed by other team members or contributors of the page may also be analyzed for label recommendation.

Figure 6:
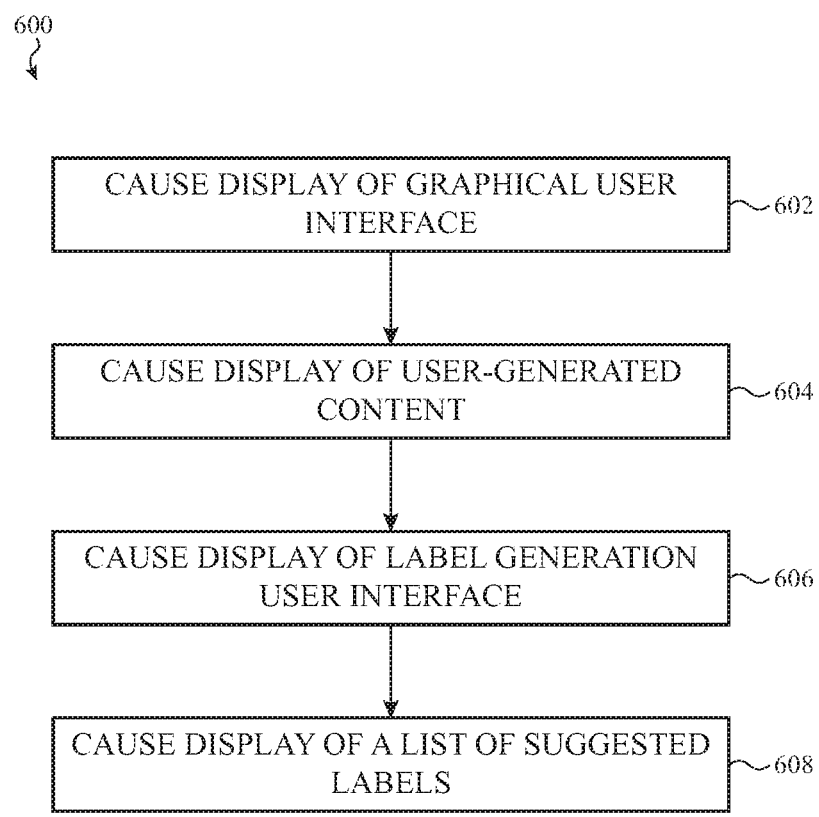
FIG. 6 depicts a flow chart of an example process for suggesting labels for an electronic document in accordance with the embodiments described herein.

FIG. 6 depicts a flow chart of an example process for suggesting labels for an electronic document in accordance with the embodiments described herein. As shown in a flow chart 600, at 602, a graphical user interface may be displayed on a client device, such as the client device 118 or 120. The graphical user interface may be in a document view mode, in other words, a user may not edit content of an electronic document or a page displayed in the graphical user interface. The graphical user interface may include a content panel, such as the content panel 208, and a navigational panel 204 including the page tree 205. The content panel may be configured to display content of the electronic document or page. The navigational panel may include a hierarchical element tree 205 (or a page tree 205) which displays each tree element (or an electronic document or a page) in an array of hierarchically arranged tree elements. Accordingly, a user can view which page is a child and/or a parent page of another page, as well as other pages at the same or other level in the page tree 205. The page tree 205 may be associated with one or more documentation spaces or domains. Further, each tree element (or the electronic document or page as referred to herein) is selectable. In other words, when a user selects a particular tree element (or the electronic document or page) by clicking, double clicking, tapping, or double tapping, or other similar user action, content of the selected electronic document or page may be displayed in the content panel.

As described herein, each user may have specific permissions with respect to an electronic document or page. Accordingly, if the user has a permission to edit the electronic document or page, the user may provide an input to transition the graphical user interface from a document edit mode to a document view mode. In some cases, the transition from edit mode to view mode includes a user input causing the page or document to be published to an authorized group of users. In the document edit mode, a user may add, replace, or remove content of the electronic document or page. Content here refers to user-generated content, labels, user feedback, comment, and so on. The content may be entered, edited, and/or removed in an editable region of the content panel. Accordingly, at 604, the content may be displayed in the content panel 208, which may have been created, edited, or otherwise modified when the graphical user interface was in the document edit mode. The content, which is user-generated content based on user input, is displayed in the content panel dynamically or in real time.

At 606, a label generation user interface may be displayed in the user-generated content region of the content panel of the electronic document or page. In some cases, the label generation user interface may be displayed in an editable region of the electronic document or page when viewed in a document or page edit mode. As described above with reference to FIGS. 2A-2C, the label generation user interface may include a text entry field, such as the text entry field 210. The text entry field in the label generation user interface may be configured to receive user input as described herein. Further the text entry field may also include, and configured to display, an array of label graphical elements, such as the label graphical elements 212a-212d, and/or a label graphical element corresponding to a label that is based on user input as described earlier with reference to FIGS. 2B and 2C.

Each label displayed in the text entry field may have a respective label score, At 608, a list of labels suggested based on analysis of content of the electronic document or page, content of one or more other electronic documents or pages that are organized together in the page tree 205 and/or viewed or accessed together (for example, based on time difference or a sequence of accessing one or more electronic documents before or after accessing the electronic document during a session) may be displayed based on the respective label score. Accordingly, a label with the highest label score may be displayed first followed by other labels having their respective label scores in a descending order. Alternatively, a label with a lower relative label score may be displayed first followed by one or more labels having a higher relative score. As described previously, such an ordering scheme may be used to promote diversity in labeling schemes by promoting less popular or less frequently used labels over labels that may risk being over used and may be less useful for being able to distinguish respective pages or documents. In some cases, labels in the list of labels may be displayed in an alphabetic order or in a random order.

While one or more labels may be created, assigned, removed, and/or unassigned from an electronic document or page in the document edit mode, the user may provide another input to transition the graphical user interface back to the document view mode. Upon transitioning the graphical user interface to the document view mode, one or more labels recommended and/or created by the user may be automatically assigned to the electronic document or page. If a label assigned to the electronic document or page is created for the first time, the label may also be added to a global list or registry of labels including labels assigned to various electronic documents or pages being managed by the document management platform.

Figure 7:
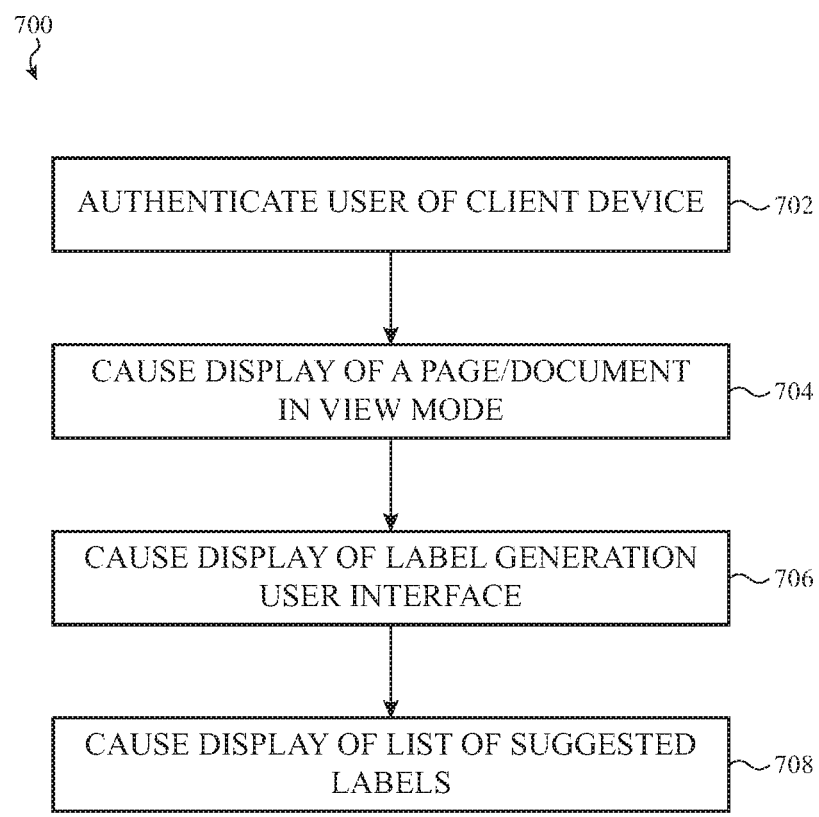
FIG. 7 depicts a flow chart of another example process for suggesting labels for an electronic document in accordance with the embodiments described herein.

FIG. 7 depicts a flow chart of another example process for suggesting labels for an electronic document in accordance with the embodiments described herein. As shown in a flow chart 700, at 702, a user of a client device accessing the document collaboration service, such as the document management service 104, may be authenticated using an authentication service, such as the authorization/authentication service 106. During authentication of the user, a user profile associated with the user may be retrieved, and permissions granted to the user with respect to one or more electronic documents or pages managed by the document management platform may be determined.

At 704, a graphical user interface may be displayed on a client device, such as the client device 118 or 120. The graphical user interface may be displayed in a view mode; in other words, a user may not edit content of an electronic document or a page displayed in the graphical user interface in the view mode. The graphical user interface may include a content panel, such as the content panel 208, and a navigational panel 204. The content panel may be configured to display content of the electronic document or page. The navigational panel 204 may include a hierarchical element tree 205 (or a page tree 205) which displays each tree element (or an electronic document or a page) in an array of hierarchically arranged tree elements. Accordingly, a user can view which page is a child and/or a parent page of another page, as well as other pages at the same or other level in the page tree 205. The page tree 205 may be associated with one or more documentation spaces or domains. Further, each tree element (or the electronic document or page as referred to herein) is selectable. In other words, when a user selects a particular tree element (or the electronic document or page) by clicking, double clicking, tapping, or double tapping, or other similar user action, content of the selected electronic document or page may be displayed in the content panel.

As described herein, a user profile retrieved during authentication of the user at 702 may identify permissions granted to the user with respect to the electronic document or page. Accordingly, if the user has a permission to edit the electronic document or page, at 706, a label generation user interface may be displayed in the view mode of the graphical user interface, which allows the user to create, assign, update, delete, remove, and/or unassign a label from the electronic document or page.

The label generation user interface may be displayed in the editable region of the content panel of the electronic document or page. As described above with reference to FIGS. 2A-2C, the label generation user interface may include a text entry field, such as the text entry field 210. The text entry field in the label generation user interface may be configured to receive user input as described herein. Further, the text entry field may also include, and configured to display, an array of label graphical elements, such as the label graphical elements 212a-212d, and/or a label graphical element corresponding to a label that is based on user input as described earlier with reference to FIGS. 2B and 2C.

Each label displayed in the text entry field may have a respective label score. At 708, a list of labels suggested based on analysis of content of the electronic document or page, content of one or more other electronic documents or pages that are organized together in the page tree 205 and/or viewed or accessed together (for example, based on time difference or a sequence of accessing one or more electronic documents before or after accessing the electronic document during a session) may be displayed based on the respective label score. Accordingly, a label with the highest label score may be displayed first followed by other labels having their respective label scores in a descending order. Alternatively, a label with the lowest label score may be displayed first followed by other labels having their respective label scores in an ascending order. In some cases, labels in the list of labels may be displayed in an alphabetic order or in a random order. In some cases, the list of suggested labels may include a predetermined number of labels, or labels having the respective label score above a predetermined threshold value.

The user may save the labels assigned to the electronic document or page by selecting an option to save the document or page, and/or labels assigned to the page. In some cases, when the user accesses another electronic document or page, or leave the electronic document or page, labels may be automatically saved as content of the electronic document or page. Further, if a label assigned to the electronic document or page is created for the first time, the label may also be added to a global list of labels including labels assigned to various electronic documents or pages being managed by the document management platform.

Figure 8:
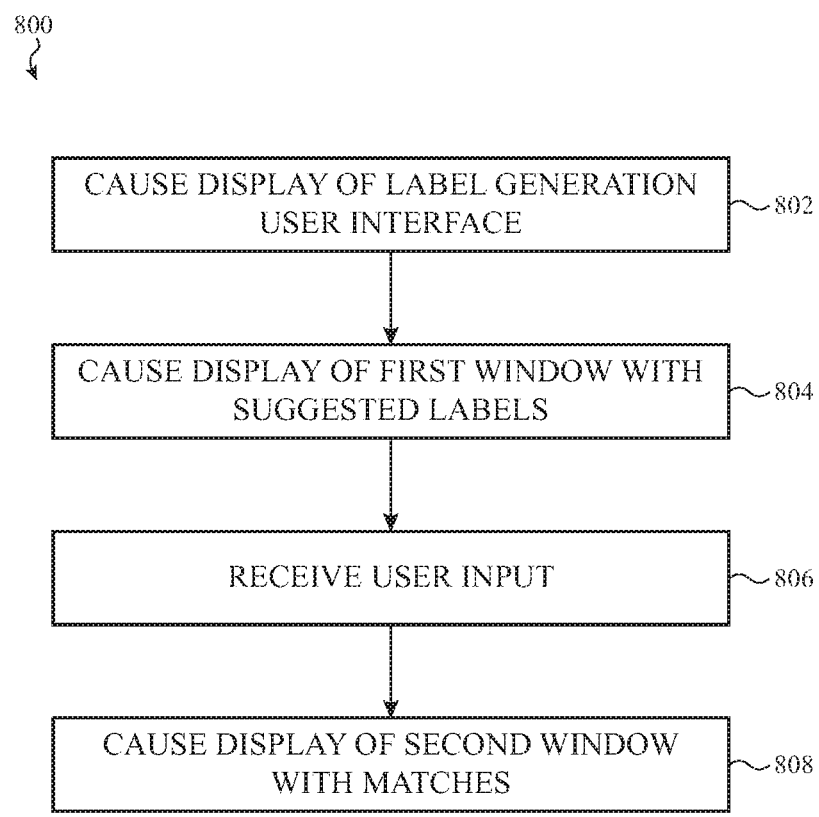
FIG. 8 depicts a flow chart of an example process for generating a graphical user interface for label suggestions for an electronic document in accordance with the embodiments described herein.

FIG. 8 depicts a flow chart of an example process for generating graphical user interface for label suggestions for an electronic document in accordance with the embodiments described herein. Similar to the previous examples described above, a graphical user interface may be displayed on a client device, such as the client device 118 or 120. The graphical user interface may be in a document view mode (or a view mode), in other words, a user may not edit content of an electronic document or a page displayed in the graphical user interface. The graphical user interface may include a content panel, such as the content panel 208, and a navigational panel, which is also referred to in this disclosure as the page tree 205. The content panel may be configured to display content of the electronic document or page. The navigational panel 204 may include a hierarchical element tree 205 (or a page tree 205) which displays each tree element (or an electronic document or a page) in an array of hierarchically arranged tree elements. Accordingly, a user can view which page is a child and/or a parent page of another page, as well as other pages at the same or other level in the page tree 205. The page tree 205 may be associated with one or more documentation spaces or domains. Further, each tree element (or the electronic document or page as referred herein) is selectable. In other words, when a user selects a particular tree element (or the electronic document or page) by clicking, double clicking, tapping, or double tapping, or other similar user action, content of the selected electronic document or page may be displayed in the content panel.

As described herein, each user may have specific permissions with respect to an electronic document or page. Accordingly, if the user has a permission to edit the electronic document or page, the user may provide an input to transition the graphical user interface displayed at 802 from the document view mode to a document edit mode (or an edit mode). In the document edit mode, a user may add, replace, remove content of the electronic document or page. Content here refers to user-generated content, labels, user feedback, comment, and so on. The content may be entered, edited, and/or removed in an editable region of the content panel. Accordingly, in response to the user entering new content and/or updating existing content of the electronic document or page, the content may be displayed in the content panel 208. The content, which is user-generated content based on user input, is displayed in the content panel dynamically or in real time.

At 804, a label generation user interface may be displayed in the content panel of the electronic document or page. For example, the label generation user interface may be displayed at a bottom of the content panel of the electronic document or page. As described above with reference to FIGS. 2A-2C, the label generation user interface may include a text entry field, such as the text entry field 210. The text entry field in the label generation user interface may be configured to receive user input as described herein. Further the text entry field may also include, and configured to display, an array of label graphical elements, such as the label graphical elements 212a-212d, and/or a label graphical element corresponding to a label that is based on user input as described earlier with reference to FIGS. 2B and 2C.

At 806, as shown in FIG. 2B, in response to a user selection within the text entry field, such as the user bringing or positioning a cursor in a predefined area of the text entry field, a pop-up window as shown in FIG. 2B may be displayed. The pop-up window shown at 806 may include a list of one or more labels suggested based on semantic analysis of the electronic document or page. Details of semantic analysis of the electronic document or page are described in detail in this disclosure, for example, with reference to FIG. 5, and therefore, these details are not repeated again for brevity.

At 808, as shown in FIG. 2C, in response to a user text input with the text entry field, such as user typing, for example, "dy" in the text entry field, another pop-up window may be displayed replacing the pop-up window displayed at 806. In some cases, content of the pop-up window displayed at 806 may be refreshed or updated. In the other pop-up window displayed replacing the pop-up window displayed at 806, or an updated pop-up window displayed at 806, a list of labels matching a partial text entry corresponding to the user text input may be displayed. The list of labels matching the partial text entry of the user input may be selected from a global list of labels that have been assigned to various electronic documents or pages managed by the document management platform. In some cases, a separate service or database may be accessed which may provide words matching the user text input.

As the user selects one of the labels displayed in the pop-up window at 808, or completes a full text input, the label selected by the user or the full text input of the user may be assigned as a label to the electronic document or page. In addition, if the label is based on the full text input of the user, and the label is used or assigned to an electronic document managed by the document management platform for the first time, the label may be added to the global list of labels. Further, the full text input of the user may be displayed in the text entry field as a label graphical element. As described herein, the label graphical element may also have a corresponding delete control option for removing, deleting, and/or unassigning the label from the electronic document or page. When it is determined that a label being removed, deleted, and/or unassigned from an electronic document, or a page is not assigned to any electronic document or page, the label may also be removed from the global list of labels.

Each label displayed in the text entry field may have a respective label score. A list or an array of labels suggested based on analysis of content of the electronic document or page, content of one or more other electronic documents or pages that are organized together in the page tree 205 and/or viewed or accessed together (for example, based on time difference or a sequence of accessing one or more electronic documents before or after accessing the electronic document during a session) may be displayed based on the respective label score. Accordingly, a label with the highest label score may be displayed first followed by other labels having their respective label scores in a descending order. Alternatively, a label with the lowest label score may be displayed first followed by other labels having their respective label scores in an ascending order. In some cases, labels in the list of labels may be displayed in an alphabetic order or in a random order.

Further, a label score may be determined based on a respective weight assigned to a source, such as a title of the current electronic document or page, content of the current electronic document or page, content of one or more pages in the displayed page tree 205, proximity of the one or more pages in the page tree 205 with the current electronic document or page, and/or semantic similarity between the content of the current page and the content of the one or more pages in the page tree 205.

Figure 9:
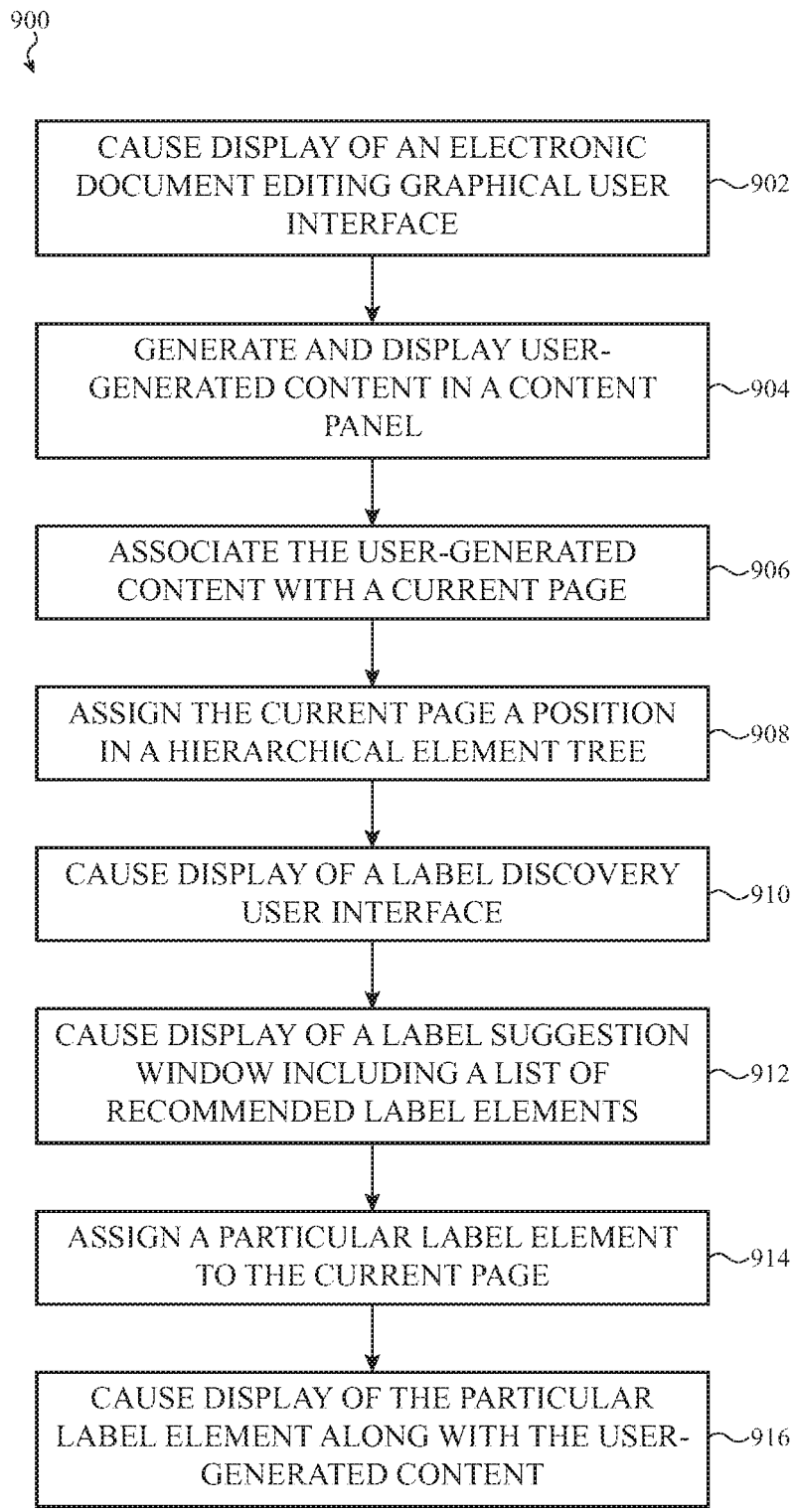
FIG. 9 depicts a flow chart of an example process for generating a graphical user interface for label suggestions for an electronic document in accordance with the embodiments described herein.

FIG. 9 depicts a flow chart of another example process for generating graphical user interface for label suggestions for an electronic document in accordance with the embodiments described herein. As shown in a flow chart 900, at 902, an electronic document editing graphical user interface (or a graphical user interface in an edit mode) may be displayed on a client device, such as the client device 118 or 120. In the edit mode and/or the view mode, the graphical user interface may include a content panel, such as the content panel 208, and a navigational panel, 204. The content panel may be configured to display content of the electronic document or page. The navigational panel may include a hierarchical element tree 205 (or a page tree 205) which displays each tree element (or an electronic document or a page) in an array of hierarchically arranged tree elements. Accordingly, a user can view which page is a child and/or a parent page of another page, as well as other pages at the same or other level in the page tree 205. The page tree 205 may be associated with one or more documentation spaces or domains. Further, each tree element (or the electronic document or page as referred to herein) is selectable. In other words, when a user selects a particular tree element (or the electronic document or page) by clicking, double clicking, tapping, or double tapping, or other similar user action, content of the selected electronic document or page may be displayed in the content panel. In some cases, the page tree 205 may be suppressed from being displayed in accordance with a user action. In other words, the user may hide the page tree 205 from being displayed in the graphical user interface.

As described herein, each user may have specific permissions with respect to an electronic document or page. Accordingly, if the user has a permission to edit the electronic document or page, at 904, the user may add, replace, and/or remove content of the electronic document or page. Content here refers to user-generated content, labels, user feedback, comment, and so on. The content may be entered, edited, and/or removed in an editable region of the content panel. Accordingly, at 906, the user-generated content may be associated with the current electronic document or page. Further, based on the user input, and/or based on analysis of the content of the current electronic document or page, the current page may be assigned a particular position in the page tree 205 at 908.

At 910, a label generation user interface (or a label discovery user interface) may be displayed in the content panel of the electronic document or page. As described above with reference to FIGS. 2A-2C, the label generation user interface may include a text entry field (or a text entry region), such as the text entry field 210. The text entry field of the label generation user interface may be positioned within the user-generated content, for example, at a bottom of the content panel. The text entry field may be configured to receive user input as described herein. Further, the text entry field may also include, and configured to display, an array of label graphical elements, such as the label graphical elements 212a-212d, and/or a label graphical element corresponding to a label that is based on user input as described earlier with reference to FIGS. 2B and 2C.

At 912, as shown in FIG. 2B, in response to a user bringing or positioning a cursor within a predefined area of the text entry field, a label suggestion window, such as a pop-up window as shown in FIG. 2B, may be displayed. The label suggestion window may include a list of one or more labels suggested based on semantic analysis of the electronic document or page. Details of semantic analysis of the electronic document or page are described in detail in this disclosure, for example, with reference to FIG. 5, and therefore, these details are not repeated again for brevity.

At 914, as shown in FIG. 2B and FIG. 2C, in response to a user selecting one of the labels displayed in the label suggestion window displayed at 912, the label selected by the user may be assigned as a label to the electronic document of page. At 916, the label assigned to the electronic document or page may be displayed along with the content of the current electronic document or page in the content panel.

Figure 10:
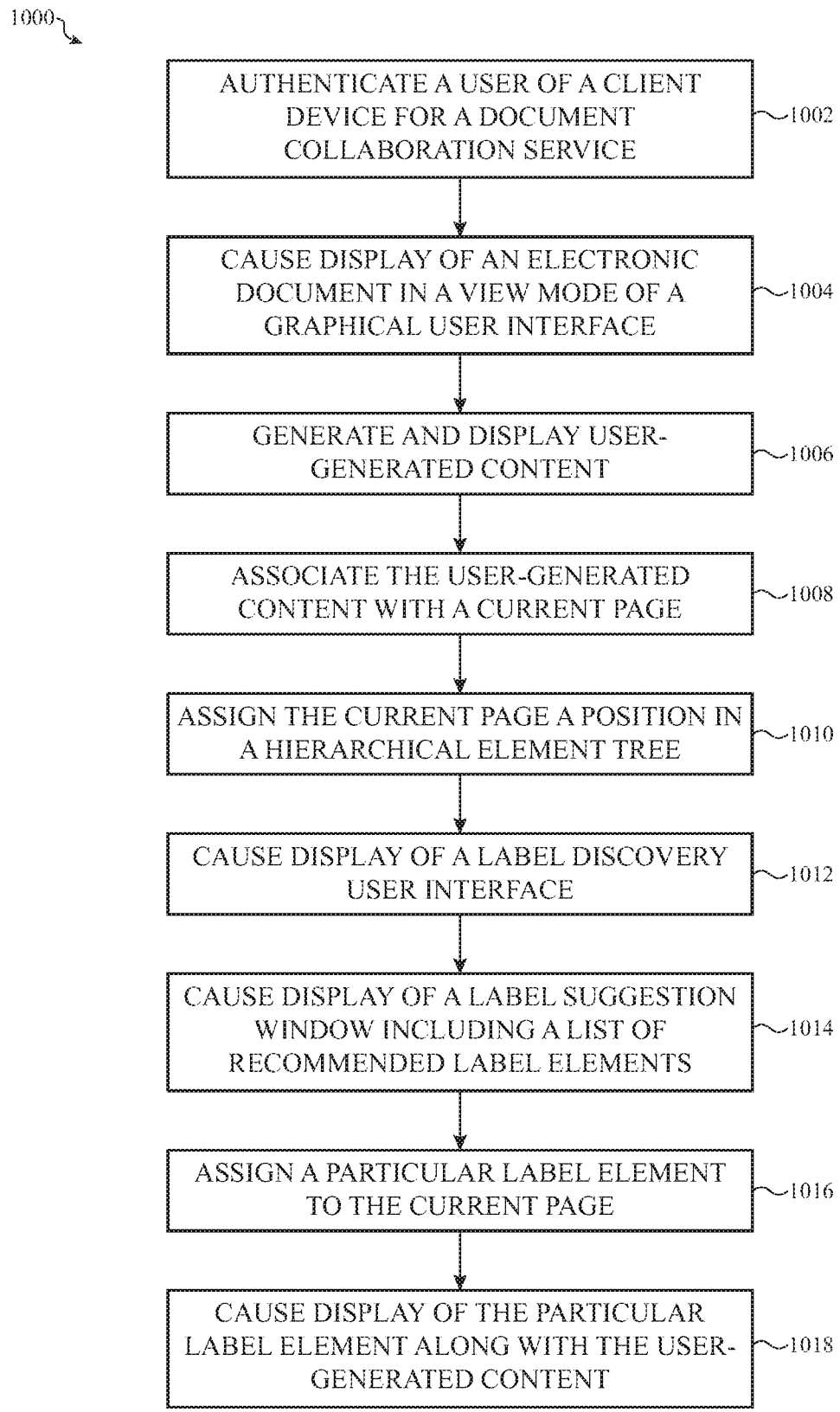
FIG. 10 depicts a flow chart of an example process for generating a graphical user interface for label suggestions for an electronic document in accordance with the embodiments described herein.

FIG. 10 depicts a flow chart of yet another example process for generating graphical user interface for label suggestions for an electronic document in accordance with the embodiments described herein. As shown in a flow chart 1000, at 1002, a user of a client device accessing the document collaboration service, such as the document management service 104, may be authenticated using an authentication service, such as the authorization/authentication service 106. During authentication of the user, a user profile associated with the user may be retrieved, and permissions granted to the user with respect to one or more electronic documents or pages managed by the document management platform may be determined.

At 1004, an electronic document viewing graphical user interface (or a graphical user interface in a view mode) may be displayed on a client device, such as the client device 118 or 120. In the view mode, the graphical user interface may include a content panel, such as the content panel 208, and a navigational panel 204. The content panel may be configured to display content of the electronic document or page. The navigational panel may include a hierarchical element tree 205 (or a page tree 205) which displays each tree element (or an electronic document or a page) in an array of hierarchically arranged tree elements. Accordingly, a user can view which page is a child and/or a parent page of another page, as well as other pages at the same or other level in the page tree 205. The page tree 205 may be associated with one or more documentation spaces or domains. Further, each tree element (or the electronic document or page as referred herein) is selectable. In other words, when a user selects a particular tree element (or the electronic document or page) by clicking, double clicking, tapping, or double tapping, or other similar user action, content of the selected electronic document or page may be displayed in the content panel.

In some cases, the page tree 205 may be suppressed from being displayed in accordance with a user action. In other words, the user may hide the page tree 205 from being displayed in the graphical user interface.

As described herein, each user may have specific permissions with respect to an electronic document or page. Accordingly, if the user has a permission to edit the electronic document or page, at 1006, the user may add, replace, and/or remove content of the electronic document or page. Content here refers to user-generated content, labels, user feedback, comment, and so on. The content may be entered, edited, and/or removed in an editable region of the content panel. Accordingly, at 1006, as the user-generated content may be displayed on the graphical user interface, and at 1008, the user-generated content may be associated with the current electronic document or page. Further, based on the user input, and/or based on analysis of the content of the current electronic document or page, the current page may be assigned a particular position in the page tree 205 at 1010.

At 1012, a label generation user interface (or a label discovery user interface) may be displayed in the content panel of the electronic document or page. As described above with reference to FIGS. 2A-2C, the label generation user interface may include a text entry field (or a text entry region), such as the text entry field 210. The text entry field of the label generation user interface may be positioned within the user-generated content, for example, at a bottom of the content panel. The text entry field may be configured to receive user input as described herein. Further the text entry field may also include, and configured to display, an array of label graphical elements, such as the label graphical elements 212a-212d, and/or a label graphical element corresponding to a label that is based on user input as described earlier with reference to FIGS. 2B and 2C.

At 1014, as shown in FIG. 2B, in response to a user bringing or positioning a cursor within a predefined area of the text entry field, a label suggestion window, such as a pop-up window as shown in FIG. 2B, may be displayed. The label suggestion window may include a list of one or more labels suggested based on semantic analysis of the electronic document or page. Details of semantic analysis of the electronic document or page are described in detail in this disclosure, for example, with reference to FIG. 5, and therefore, these details are not repeated again for brevity. In some cases, a label suggested and included in a list of suggested labels in the label suggestion window may be determined based on content of one or more pages to which the user may or may not have permissions to edit and/or view the content of the corresponding pages.

At 1016, as shown in FIG. 2B and FIG. 2C, in response to a user selecting one of the labels displayed in the label suggestion window displayed at 1014, the label selected by the user may be assigned as a label to the electronic document or page. At 1018, the label assigned to the electronic document or page may be displayed along with the content of the current electronic document or page in the content panel.

Figure 11:
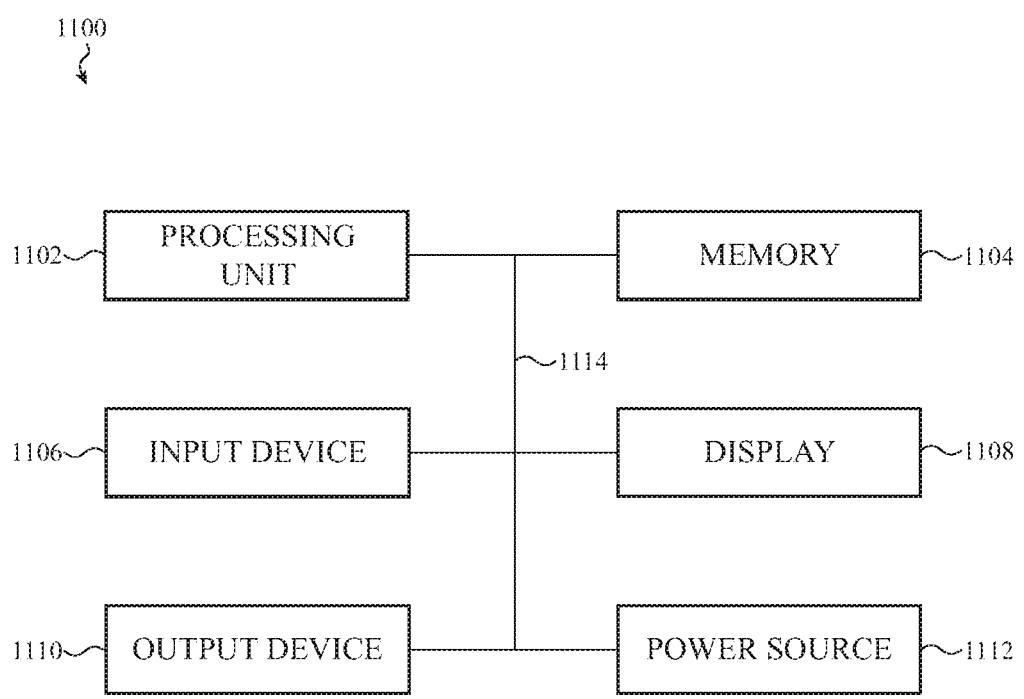
FIG. 11 depicts an example hardware for devices of the systems described herein.

FIG. 11 shows a sample electrical block diagram of an electronic device 1100 that may perform the operations described herein. The electronic device 1100 may in some cases take the form of any of the electronic devices described with reference to FIGS. 1-4C, including client devices, and/or servers or other computing devices associated with the collaboration system 100. The electronic device 1100 can include one or more of a processing unit 1102, a memory 1104 or storage device, input devices 1106, a display 1108, output devices 1110, and a power source 1112. In some cases, various implementations of the electronic device 1100 may lack some or all of these components and/or include additional or alternative components.

The processing unit 1102 can control some or all of the operations of the electronic device 1100. The processing unit 1102 can communicate, either directly or indirectly, with some or all of the components of the electronic device 1100. For example, a system bus or other communication mechanism 1114 can provide communication between the processing unit 1102, the power source 1112, the memory 1104, the input device(s) 1106, and the output device(s) 1110.

The processing unit 1102 can be implemented as any electronic device capable of processing, receiving, or transmitting data or instructions. For example, the processing unit 1102 can be a microprocessor, a central processing unit (CPU), an application-specific integrated circuit (ASIC), a digital signal processor (DSP), or combinations of such devices. As described herein, the term "processing unit" is meant to encompass a single processor or processing unit, multiple processors, multiple processing units, or other suitably configured computing element or elements.

It should be noted that the components of the electronic device 1100 can be controlled by multiple processing units. For example, select components of the electronic device 1100 (e.g., an input device 1106) may be controlled by a first processing unit and other components of the electronic device 1100 (e.g., the display 1108) may be controlled by a second processing unit, where the first and second processing units may or may not be in communication with each other.

The power source 1112 can be implemented with any device capable of providing energy to the electronic device 1100. For example, the power source 1112 may be one or more batteries or rechargeable batteries. Additionally, or alternatively, the power source 1112 can be a power connector or power cord that connects the electronic device 1100 to another power source, such as a wall outlet.

The memory 1104 can store electronic data that can be used by the electronic device 1100. For example, the memory 1104 can store electronic data or content such as, for example, audio and video files, documents and applications, device settings and user preferences, timing signals, control signals, and data structures or databases. The memory 1104 can be configured as any type of memory. By way of example only, the memory 1104 can be implemented as random access memory, read-only memory, Flash memory, removable memory, other types of storage elements, or combinations of such devices.

In various embodiments, the display 1108 provides a graphical output, for example associated with an operating system, user interface, and/or applications of the electronic device 1100 (e.g., a chat user interface, an issue-tracking user interface, an issue-discovery user interface, etc.). In one embodiment, the display 1108 includes one or more sensors and is configured as a touch-sensitive (e.g., single-touch, multi-touch) and/or force-sensitive display to receive inputs from a user. For example, the display 1108 may be integrated with a touch sensor (e.g., a capacitive touch sensor) and/or a force sensor to provide a touch- and/or force-sensitive display. The display 1108 is operably coupled to the processing unit 1102 of the electronic device 1100.

The display 1108 can be implemented with any suitable technology, including, but not limited to, liquid crystal display (LCD) technology, light emitting diode (LED) technology, organic light-emitting display (OLED) technology, organic electroluminescence (OEL) technology, or another type of display technology. In some cases, the display 1108 is positioned beneath and viewable through a cover that forms at least a portion of an enclosure of the electronic device 1100.

In various embodiments, the input devices 1106 may include any suitable components for detecting inputs. Examples of input devices 1106 include light sensors, temperature sensors, audio sensors (e.g., microphones), optical or visual sensors (e.g., cameras, visible light sensors, or invisible light sensors), proximity sensors, touch sensors, force sensors, mechanical devices (e.g., crowns, switches, buttons, or keys), vibration sensors, orientation sensors, motion sensors (e.g., accelerometers or velocity sensors), location sensors (e.g., global positioning system (GPS) devices), thermal sensors, communication devices (e.g., wired or wireless communication devices), resistive sensors, magnetic sensors, electroactive polymers (EAPs), strain gauges, electrodes, and so on, or some combination thereof. Each input device 1106 may be configured to detect one or more particular types of input and provide a signal (e.g., an input signal) corresponding to the detected input. The signal may be provided, for example, to the processing unit 1102.

As discussed above, in some cases, the input device(s) 1106 include a touch sensor (e.g., a capacitive touch sensor) integrated with the display 1108 to provide a touch-sensitive display. Similarly, in some cases, the input device(s) 1106 include a force sensor (e.g., a capacitive force sensor) integrated with the display 1108 to provide a force-sensitive display.

The output devices 1110 may include any suitable components for providing outputs. Examples of output devices 1110 include light emitters, audio output devices (e.g., speakers), visual output devices (e.g., lights or displays), tactile output devices (e.g., haptic output devices), communication devices (e.g., wired or wireless communication devices), and so on, or some combination thereof. Each output device 1110 may be configured to receive one or more signals (e.g., an output signal provided by the processing unit 1102) and provide an output corresponding to the signal.

In some cases, input devices 1106 and output devices 1110 are implemented together as a single device. For example, an input/output device or port can transmit electronic signals via a communications network, such as a wireless and/or wired network connection. Examples of wireless and wired network connections include, but are not limited to, cellular, Wi-Fi, Bluetooth, IR, and Ethernet connections.

The processing unit 1102 may be operably coupled to the input devices 1106 and the output devices 1110. The processing unit 1102 may be adapted to exchange signals with the input devices 1106 and the output devices 1110. For example, the processing unit 1102 may receive an input signal from an input device 1106 that corresponds to an input detected by the input device 1106. The processing unit 1102 may interpret the received input signal to determine whether to provide and/or change one or more outputs in response to the input signal. The processing unit 1102 may then send an output signal to one or more of the output devices 1110, to provide and/or change outputs as appropriate.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the some embodiments of the invention, whether or not such embodiments are described, and whether or not such features are presented as being a part of a described embodiment. Thus, the breadth and scope of the present invention should not be limited by any of the above-described exemplary embodiments but is instead defined by the claims herein presented.

Furthermore, the foregoing examples and description of instances of purpose-configured software, whether accessible via API as a request-response service, an event-driven service, or whether configured as a self-contained data processing service are understood as not exhaustive. In other words, a person of skill in the art may appreciate that the various functions and operations of a system such as described herein can be implemented in a number of suitable ways, developed leveraging any number of suitable libraries, frameworks, first or third-party APIs, local or remote databases (whether relational, NoSQL, or other architectures, or a combination thereof), programming languages, software design techniques (e.g., procedural, asynchronous, event-driven, and so on or any combination thereof), and so on.

The various functions described herein can be implemented in the same manner (as one example, leveraging a common language and/or design), or in different ways. In many embodiments, functions of a system described herein are implemented as discrete microservices, which may be containerized or executed/instantiated leveraging a discrete virtual machine, that are only responsive to authenticated API requests from other microservices of the same system. Similarly, each microservice may be configured to provide data output and receive data input across an encrypted data channel. In some cases, each microservice may be configured to store its own data in a dedicated encrypted database; in others, microservices can store encrypted data in a common database; whether such data is stored in tables shared by multiple microservices or whether microservices may leverage independent and separate tables/schemas can vary from embodiment to embodiment. As a result of these described and other equivalent architectures, it may be appreciated that a system such as described herein can be implemented in a number of suitable ways. For simplicity of description, many embodiments that follow are described in reference to an implementation in which discrete functions of the system are implemented as discrete microservices. It is appreciated that this is merely one possible implementation.

In addition, it is understood that organizations and/or entities responsible for the access, aggregation, validation, analysis, disclosure, transfer, storage, or other use of private data such as described herein will preferably comply with published and industry-established privacy, data, and network security policies and practices. For example, it is understood that data and/or information obtained from remote or local data sources, only on informed consent of the subject of that data and/or information, should be accessed or aggregated only for legitimate, agreed-upon, and reasonable uses.

What is claimed is:

1. A computer-implemented method for managing electronic content of an electronic document management service, the method comprising:
   causing display of a graphical user interface of a content collaboration platform in a document edit mode on a client device, the graphical user interface comprising:
      a content panel configured to receive user input generating document content of a current document; and
      a navigational panel comprising a user-defined hierarchical element tree having an array of user-defined hierarchically arranged tree elements generated in response to user input events, each tree element selectable to cause document content of a respective electronic document displayed in the content panel;
   within the current document and in response to a user input, transitioning the graphical user interface of the content panel from the document edit mode to a document view mode; and
   while in the document view mode and in accordance with a user of the client device being authenticated and having edit permissions with respect to the current document:
      causing display of the document content of the current document in the content panel;
      causing display of a label generation user interface within the content panel, the label generation user interface comprising:
         a text entry field configured to receive text input; and
         an array of selectable label graphical elements positioned within the text entry field; and in response to a user selection within the text entry field, causing display of a list of suggested labels,— each suggested label in the list of suggested labels displayed in accordance with a respective label score, the respective label score based on multiple heuristics including:
  a portion of the document content;
  a proximity of a current element in the array of user-defined hierarchically arranged tree elements corresponding to the current document with respect to other elements in the array of user-defined hierarchically arranged tree elements corresponding to other respective labeled documents, the proximity relating to a sibling, children, or parent relationship between the current element and other elements;
  an existing label within one or more of the respective labeled documents referenced in the array of user-defined hierarchically arranged tree elements; and
  a similarity between keywords of a respective document and the current document.

2. The computer-implemented method of claim 1, wherein a particular label in the list of suggested labels has an increased label score in accordance with an increased proximity of the current element corresponding to the current document with respect to a respective element of a respective labeled document in the user-defined hierarchical element tree.

3. The computer-implemented method of claim 1, wherein:
  the list of suggested labels is presented as an ordered list;
  a first suggested label with a first label score is displayed earlier in an order before a second suggested label with a second label score; and
  the second label score is higher than the first label score.

4. The computer-implemented method of claim 1, wherein:
  the respective label score is based on, at least in part, a popularity index of a respective suggested label; and
  the popularity index is based on a number of times the respective suggested label is selected by a system user.

5. The computer-implemented method of claim 1, wherein:
  each selectable label graphical element of the array of selectable label graphical elements is a selectable element, and
  the computer-implemented method further comprises:
    in response to a user selection of a particular label graphical element associated with a particular label, causing display of a list of one or more electronic documents associated with the particular label graphical element.

6. The computer-implemented method of claim 1, wherein the respective label score is based, at least in part, on labels associated with documents having a threshold number of navigational events between a previous navigation to the current document and a navigation to a respective document having a respective label.

7. The computer-implemented method of claim 6, wherein the respective document was navigated to immediately previous to or immediate subsequent to a navigation to the current document.

8. The computer-implemented method of claim 1, wherein the respective label score is based, at least in part, on labels associated with documents viewed during a current session.

9. The computer-implemented method of claim 1, wherein the list of suggested labels includes a predetermined number of labels.

10. A computer-implemented method for managing electronic content of an electronic content collaboration service, the method comprising:
  authenticating a user of a client device with respect to the content collaboration service;
  causing display of an electronic document in a view mode of a graphical user interface of a content collaboration platform on the client device, the view mode of the graphical user interface comprising:
    a content panel configured to display content of the electronic document; and
    a navigational panel comprising a user-defined hierarchical element tree generated in response to user input events, the user-defined hierarchical element tree having an array of hierarchically arranged tree elements, each tree element of the user-defined hierarchical element tree is selectable to cause display of content of a respective electronic document in the content panel;
  in accordance with the authenticating the user having edit permissions with respect to the displayed electronic document, causing display, within the content panel of the electronic document, of a label generation user interface, the label generation user interface comprising:
    a text entry field configured to receive text input; and
    an array of label graphical elements positioned within the text entry field; and
  in response to a user selection within the text entry field, causing display of a list of suggested labels, each label in the list of suggested labels selected in accordance with a respective label score, the respective label score computed based on:
    an analysis of content of the electronic document being displayed on the client device;
    a proximity of one or more labeled electronic documents listed in the user-defined hierarchical element tree with respect to the electronic document being displayed on the client device, the proximity relating to a sibling, children, or parent relationship between the electronic document and the one or more labeled electronic documents; and
    an existing label within the one or more labeled electronic documents referenced in the user-defined hierarchical element tree; and
    a semantic similarity between content of the electronic document with other content of a labeled electronic document of the user-defined hierarchical element tree.

11. The computer-implemented method of claim 10, wherein:
  the list of suggested labels is presented as an ordered list;
  a first suggested label with a first label score is displayed earlier in an order before a second suggested label with a second label score; and
  the second label score is higher than the first label score.

12. The computer-implemented method of claim 10, wherein:
  the respective label score is based on, at least in part, a popularity index of a respective suggested label; and
  the popularity index is based on a number of times the respective suggested label is assigned to a document of the user-defined hierarchical element tree by a system user.

13. The computer-implemented method of claim 10, wherein the semantic similarity includes an analysis of a document title and a document summary.

14. The computer-implemented method of claim 11, wherein the list of suggested labels includes a predetermined number of labels, or labels having the respective label score above a predetermined threshold value.

15. A server, comprising:
computer memory storing instructions; and
a processing unit configured to execute the stored instructions, which causes the server to perform operations comprising:
 authenticating a user of a client device with respect to a content collaboration service;
 causing display of a graphical user interface of a content collaboration platform in a page view mode, the graphical user interface comprising:
  a content panel configured to display page content of a current page; and
  a navigational panel comprising a user-defined hierarchical element tree generated in response to user input events, the user-defined hierarchical element tree having an array of hierarchically arranged tree elements, each tree element selectable to cause display of page content of a respective page in the content panel; and
 while the graphical user interface is in a document view mode within the current page:
  in accordance with the user having edit permissions with respect to the current page, causing display of a label generation user interface, the label generation user interface comprising:
   a text entry field configured to receive text input; and
   an array of label graphical elements positioned within the text entry field; and
  in response to a user selection within the text entry field, causing display of a list of suggested labels, each suggested label in the list of suggested labels displayed in accordance with a respective label score, the respective label score computed for each label with respect to the current page using a set of heuristics, the set of heuristics including:
   a portion of the page content;
   a proximity of a current element of the user-defined hierarchical element tree with respect to another element of a labeled document of the user-defined hierarchical element tree, the proximity relating to a sibling, children, or parent relationship between the current element and the another element;
   an existing label within the labeled document referenced in the user-defined hierarchical element tree; and
   a semantic similarity between the page content of the current page and a page content of a respective page including in the user-defined hierarchical element tree.

16. The server of claim 15, wherein the set of heuristics comprises:
a first popularity index of a respective label within a document space; and
a second popularity index of the respective label across multiple document spaces.

17. The server of claim 15, wherein:
the list of suggested labels is presented as an ordered list;
a first suggested label with a first label score is displayed earlier in an order before a second suggested label with a second label score; and
the second label score is higher than the first label score.

* * * * *